United States Patent
Thompson et al.

(10) Patent No.: US 12,434,436 B2
(45) Date of Patent: *Oct. 7, 2025

(54) ACCUMALATOR ASSEMBLY FOR ADDITIVE MANUFACTURING

(71) Applicant: General Electric Company, Schenectady, NY (US)

(72) Inventors: Mary Kathryn Thompson, Fairfield Township, OH (US); Meredith Elissa Dubelman, Liberty Township, OH (US); Christopher David Barnhill, Cincinnati, OH (US); Xi Yang, Mason, OH (US); Trent William Muhlenkamp, Cincinnati, OH (US); William Joseph Steele, Lawrenceburg, IN (US)

(73) Assignee: General Electric Company, Evendale, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/524,972

(22) Filed: Nov. 30, 2023

(65) Prior Publication Data
US 2024/0100774 A1 Mar. 28, 2024

Related U.S. Application Data

(63) Continuation of application No. 17/186,685, filed on Feb. 26, 2021, now Pat. No. 11,865,780.

(51) Int. Cl.
*B29C 64/236* (2017.01)
*B29C 64/124* (2017.01)
(Continued)

(52) U.S. Cl.
CPC .......... *B29C 64/236* (2017.08); *B29C 64/124* (2017.08); *B29C 64/245* (2017.08);
(Continued)

(58) Field of Classification Search
CPC ... B29C 64/236; B29C 64/124; B29C 64/357; B29C 64/245; B29C 64/386; B33Y 10/00; B33Y 30/00; B33Y 40/00; B33Y 50/00
See application file for complete search history.

(56) References Cited

U.S. PATENT DOCUMENTS

| | | | |
|---|---|---|---|
| 1,990,749 A | 2/1935 | Phillips et al. | |
| 2,259,517 A | 10/1941 | Drenkard, Jr. | |

(Continued)

FOREIGN PATENT DOCUMENTS

| | | | |
|---|---|---|---|
| CN | 103210344 A | 7/2013 | |
| CN | 103522546 A | 1/2014 | |

(Continued)

OTHER PUBLICATIONS

Admatec, Admaflex 300 DLP 3D Printer, Specifications, Features, Design and Functions, Netherlands, 2 Pages. Retrieved Nov. 5, 2020 from Webpage: https://admateceurope.com/files/10f1a369c2239943e6506f27ba920bd4dd9359078e744369695ab6ffbde75c6c?filename=Admaflex%20300%20brochure.pdf&sig=hQvDizxkSmFOZwjM.

(Continued)

*Primary Examiner* — Nahida Sultana
(74) *Attorney, Agent, or Firm* — Dinsmore & Shohl LLP

(57) ABSTRACT

An additive manufacturing apparatus includes a feed module and a take-up module that are configured to operably couple with a foil. A stage is configured to hold one or more cured layers of a resin that form a component. A radiant energy device is positioned opposite to the at least one stage. The radiant energy device is operable to generate and project radiant energy in a predetermined pattern. An actuator is configured to change a relative position of the at least one stage and the foil. An accumulator is positioned between the feed module and the take-up module. The accumulator is configured to retain an intermediate portion of the foil to (Continued)

allow a first portion of the foil upstream of the accumulator to move at a first speed and a second portion of the foil downstream of the accumulator to move at a second speed during a defined time period.

14 Claims, 14 Drawing Sheets

(51) Int. Cl.
  *B29C 64/245* (2017.01)
  *B29C 64/357* (2017.01)
  *B29C 64/386* (2017.01)
  *B33Y 10/00* (2015.01)
  *B33Y 30/00* (2015.01)
  *B33Y 40/00* (2020.01)
  *B33Y 50/00* (2015.01)

(52) U.S. Cl.
  CPC .......... *B29C 64/357* (2017.08); *B29C 64/386* (2017.08); *B33Y 10/00* (2014.12); *B33Y 30/00* (2014.12); *B33Y 40/00* (2014.12); *B33Y 50/00* (2014.12)

(56) References Cited

U.S. PATENT DOCUMENTS

| | | |
|---|---|---|
| 3,264,103 A | 8/1966 | Cohen et al. |
| 3,395,014 A | 7/1968 | Cohen et al. |
| 3,486,482 A | 12/1969 | Hunger |
| 3,710,846 A | 1/1973 | Properzi |
| 3,875,067 A | 4/1975 | DeSorgo et al. |
| 3,991,149 A | 11/1976 | Hurwitt |
| 4,041,476 A | 8/1977 | Swainson |
| 4,292,827 A | 10/1981 | Waugh |
| 4,575,330 A | 3/1986 | Hull |
| 4,752,498 A | 6/1988 | Fudim |
| 4,945,032 A | 7/1990 | Murphy et al. |
| 5,015,312 A | 5/1991 | Kinzie |
| 5,026,146 A | 6/1991 | Hug et al. |
| 5,031,120 A | 7/1991 | Pomerantz et al. |
| 5,058,988 A | 10/1991 | Spence et al. |
| 5,059,021 A | 10/1991 | Spence et al. |
| 5,088,047 A | 2/1992 | Bynum |
| 5,094,935 A | 3/1992 | Vassiliou et al. |
| 5,096,530 A | 3/1992 | Cohen |
| 5,104,592 A | 4/1992 | Hull et al. |
| 5,123,734 A | 6/1992 | Spence et al. |
| 5,126,259 A | 6/1992 | Weiss et al. |
| 5,126,529 A | 6/1992 | Weiss et al. |
| 5,133,987 A | 7/1992 | Spence et al. |
| 5,162,167 A | 11/1992 | Minh et al. |
| 5,174,931 A | 12/1992 | Almquist et al. |
| 5,175,077 A | 12/1992 | Grossa |
| 5,182,055 A | 1/1993 | Allison et al. |
| 5,183,598 A | 2/1993 | Helle et al. |
| 5,192,559 A | 3/1993 | Hull et al. |
| 5,203,944 A | 4/1993 | Prinz et al. |
| 5,204,055 A | 4/1993 | Sachs et al. |
| 5,207,371 A | 5/1993 | Prinz et al. |
| 5,236,326 A | 8/1993 | Grossa |
| 5,236,637 A | 8/1993 | Hull |
| 5,236,812 A | 8/1993 | Vassiliou et al. |
| 5,247,180 A | 9/1993 | Mitcham et al. |
| 5,248,456 A | 9/1993 | Evans, Jr. et al. |
| 5,258,146 A | 11/1993 | Almquist et al. |
| 5,314,711 A | 5/1994 | Baccini |
| 5,340,656 A | 8/1994 | Sachs et al. |
| 5,387,380 A | 2/1995 | Cima et al. |
| 5,432,045 A | 7/1995 | Narukawa et al. |
| 5,447,822 A | 9/1995 | Hull et al. |
| 5,454,069 A | 9/1995 | Knapp et al. |
| 5,460,758 A | 10/1995 | Langer et al. |
| 5,496,682 A | 3/1996 | Quadir et al. |
| 5,607,540 A | 3/1997 | Onishi |
| 5,610,824 A | 3/1997 | Vinson et al. |
| 5,626,919 A | 5/1997 | Chapman et al. |
| 5,650,260 A | 7/1997 | Onishi |
| 5,660,621 A | 8/1997 | Bredt |
| 5,665,401 A | 9/1997 | Serbin et al. |
| 5,688,464 A | 11/1997 | Jacobs et al. |
| 5,693,144 A | 12/1997 | Jacobs et al. |
| 5,697,043 A | 12/1997 | Baskaran et al. |
| 5,717,599 A | 2/1998 | Menhennett et al. |
| 5,718,279 A | 2/1998 | Saoth et al. |
| 5,746,833 A | 5/1998 | Gerhardt |
| 5,764,521 A | 6/1998 | Batchelder et al. |
| 5,807,437 A | 9/1998 | Sachs et al. |
| 5,824,184 A | 10/1998 | Kamijo et al. |
| 5,851,465 A | 12/1998 | Bredt |
| 5,861,911 A * | 1/1999 | Oosaka .............. H04N 1/00129 348/373 |
| 5,866,058 A | 2/1999 | Batchelder et al. |
| 5,895,547 A | 4/1999 | Kathrein et al. |
| 5,900,207 A | 5/1999 | Danforth et al. |
| 5,939,008 A | 8/1999 | Comb et al. |
| 5,940,674 A | 8/1999 | Sachs et al. |
| 5,945,058 A | 8/1999 | Manners et al. |
| 5,968,561 A | 10/1999 | Batchelder et al. |
| 5,980,813 A | 11/1999 | Narang et al. |
| 5,985,204 A | 11/1999 | Otsuka et al. |
| 6,051,179 A | 4/2000 | Hagenau |
| 6,067,480 A | 5/2000 | Stuffle et al. |
| 6,068,367 A | 5/2000 | Fabbri |
| 6,110,411 A | 8/2000 | Clausen et al. |
| 6,146,567 A | 11/2000 | Sachs et al. |
| 6,193,923 B1 | 2/2001 | Leyden et al. |
| 6,200,646 B1 | 3/2001 | Neckers et al. |
| 6,206,672 B1 | 3/2001 | Grenda |
| 6,363,606 B1 | 4/2002 | Johnson et al. |
| 6,375,451 B1 | 4/2002 | Robinson et al. |
| 6,376,148 B1 | 4/2002 | Liu et al. |
| 6,391,245 B1 | 5/2002 | Smith |
| 6,399,010 B1 | 6/2002 | Guertin et al. |
| 6,401,002 B1 | 6/2002 | Jang et al. |
| 6,403,002 B1 | 6/2002 | van der Geest |
| 6,436,520 B1 | 8/2002 | Yamamoto |
| 6,450,393 B1 | 9/2002 | Doumanidis et al. |
| 6,463,349 B2 | 10/2002 | White et al. |
| 6,471,800 B2 | 10/2002 | Jang et al. |
| 6,500,378 B1 | 12/2002 | Smith |
| 6,512,869 B1 | 1/2003 | Imayama et al. |
| 6,543,506 B1 | 4/2003 | Phillips |
| 6,575,218 B1 | 6/2003 | Burns et al. |
| 6,596,224 B1 | 7/2003 | Sachs et al. |
| 6,641,897 B2 | 11/2003 | Gervasi |
| 6,649,113 B1 | 11/2003 | Manners et al. |
| 6,660,209 B2 | 12/2003 | Leyden et al. |
| 6,668,892 B2 | 12/2003 | Vasilakes et al. |
| 6,682,598 B1 | 1/2004 | Steinmueller et al. |
| 6,780,368 B2 | 8/2004 | Liu et al. |
| 6,786,711 B2 | 9/2004 | Koch et al. |
| 6,838,035 B1 | 1/2005 | Ederer et al. |
| 6,850,334 B1 | 2/2005 | Gothait |
| 6,852,272 B2 | 2/2005 | Artz et al. |
| 6,896,839 B2 | 5/2005 | Kubo et al. |
| 6,914,406 B1 | 7/2005 | Wilkes et al. |
| 6,930,144 B2 | 8/2005 | Oriakhi |
| 6,947,058 B1 | 9/2005 | Elmquist |
| 6,966,960 B2 | 11/2005 | Boyd et al. |
| 6,974,521 B2 | 12/2005 | Schermer |
| 6,986,654 B2 | 1/2006 | Imiolek et al. |
| 7,008,209 B2 | 3/2006 | Iskra et al. |
| 7,016,738 B1 | 3/2006 | Karunasiri |
| 7,022,207 B2 | 4/2006 | Hirsch |
| 7,045,738 B1 | 5/2006 | Kovacevic et al. |
| 7,052,263 B2 | 5/2006 | John |
| 7,070,250 B2 | 7/2006 | Lester et al. |
| 7,074,029 B2 | 7/2006 | Stockwell et al. |
| 7,084,875 B2 | 8/2006 | Plante |
| 7,087,109 B2 | 8/2006 | Bredr et al. |
| 7,158,849 B2 | 1/2007 | Huang et al. |
| 7,164,420 B2 | 1/2007 | Ard |

(56) References Cited

U.S. PATENT DOCUMENTS

| | | | |
|---|---|---|---|
| 7,195,472 | B2 | 3/2007 | John |
| 7,261,542 | B2 | 8/2007 | Hickerson et al. |
| 7,270,528 | B2 | 9/2007 | Sherwood |
| 7,300,613 | B2 | 11/2007 | Sano et al. |
| 7,351,304 | B2 | 4/2008 | Liang et al. |
| 7,402,219 | B2 | 7/2008 | Graf |
| 7,438,846 | B2 | 10/2008 | John |
| 7,455,804 | B2 | 11/2008 | Patel et al. |
| 7,520,740 | B2 | 4/2009 | Wahlstrom et al. |
| 7,550,518 | B2 | 6/2009 | Bredt et al. |
| 7,555,726 | B2 | 6/2009 | Kurtenbach et al. |
| 7,569,174 | B2 | 8/2009 | Ruatta et al. |
| 7,572,403 | B2 | 8/2009 | Gu et al. |
| 7,575,682 | B2 | 8/2009 | Olsta et al. |
| 7,578,958 | B2 | 8/2009 | Patel et al. |
| 7,614,866 | B2 | 11/2009 | Sperry et al. |
| 7,614,886 | B2 | 11/2009 | Sperry et al. |
| 7,636,610 | B2 | 12/2009 | Schillen et al. |
| 7,698,947 | B2 | 4/2010 | Sarr |
| 7,706,910 | B2 | 4/2010 | Hull et al. |
| 7,742,060 | B2 | 6/2010 | Maillot |
| 7,758,799 | B2 | 7/2010 | Hull et al. |
| 7,767,132 | B2 | 8/2010 | Patel et al. |
| 7,771,183 | B2 | 8/2010 | Hull et al. |
| 7,780,429 | B2 | 8/2010 | Kikuchi |
| 7,783,371 | B2 | 8/2010 | John et al. |
| 7,785,093 | B2 | 8/2010 | Holmboe et al. |
| 7,790,093 | B2 | 9/2010 | Shkolnik et al. |
| 7,795,349 | B2 | 9/2010 | Bredt et al. |
| 7,815,826 | B2 | 10/2010 | Serdy et al. |
| 7,845,930 | B2 | 12/2010 | Shkolnik et al. |
| 7,867,302 | B2 | 1/2011 | Nevoret et al. |
| 7,892,474 | B2 | 2/2011 | Shkolnik et al. |
| 7,894,921 | B2 | 2/2011 | John et al. |
| 7,931,460 | B2 | 4/2011 | Scott et al. |
| 7,962,238 | B2 | 6/2011 | Shkolnik et al. |
| 7,964,047 | B2 | 6/2011 | Ishida |
| 7,995,073 | B1 | 8/2011 | Shemanarev et al. |
| 8,003,040 | B2 | 8/2011 | El-Siblani |
| 8,029,642 | B2 | 10/2011 | Hagman |
| 8,048,261 | B2 | 11/2011 | McCowin |
| 8,070,473 | B2 | 12/2011 | Kozlak |
| 8,071,055 | B2 | 12/2011 | Newcombe |
| 8,096,262 | B2 | 1/2012 | Ederer et al. |
| 8,105,066 | B2 | 1/2012 | Sperry et al. |
| 8,110,135 | B2 | 2/2012 | El-Siblani |
| 8,126,580 | B2 | 2/2012 | El-Siblani et al. |
| 8,157,908 | B2 | 4/2012 | Williams |
| 8,185,229 | B2 | 5/2012 | Davidson |
| 8,191,500 | B2 | 6/2012 | Dohring et al. |
| 8,211,226 | B2 | 7/2012 | Bredt et al. |
| 8,232,444 | B2 | 7/2012 | Bar Nathan et al. |
| 8,259,103 | B2 | 9/2012 | Glueck et al. |
| 8,269,767 | B2 | 9/2012 | Glueck et al. |
| 8,282,866 | B2 | 10/2012 | Hiraide |
| 8,326,024 | B2 | 12/2012 | Shkolnik |
| 8,372,330 | B2 | 2/2013 | El-Siblani et al. |
| 8,394,313 | B2 | 3/2013 | El-Siblani et al. |
| 8,413,578 | B2 | 4/2013 | Doyle |
| 8,424,580 | B2 | 4/2013 | Anderson et al. |
| 8,444,903 | B2 | 5/2013 | Lyons et al. |
| 8,454,879 | B2 | 6/2013 | Kuzusako et al. |
| 8,475,946 | B1 | 7/2013 | Dion et al. |
| 8,506,862 | B2 | 8/2013 | Giller et al. |
| 8,506,870 | B2 | 8/2013 | Hochsmann et al. |
| 8,513,562 | B2 | 8/2013 | Bichsel |
| 8,522,159 | B2 | 8/2013 | Kurtenbach et al. |
| 8,540,501 | B2 | 9/2013 | Yasukochi |
| 8,568,646 | B2 | 10/2013 | Wang et al. |
| 8,568,649 | B1 | 10/2013 | Balistreri et al. |
| 8,593,083 | B2 | 11/2013 | Firhoj et al. |
| 8,616,872 | B2 | 12/2013 | Matsui et al. |
| 8,623,264 | B2 | 1/2014 | Rohner et al. |
| 8,636,494 | B2 | 1/2014 | Gothait et al. |
| 8,636,496 | B2 | 1/2014 | Das et al. |
| 8,658,076 | B2 | 2/2014 | El-Siblani |
| 8,663,568 | B2 | 3/2014 | Bar Nathan et al. |
| 8,666,142 | B2 | 3/2014 | Shkolnik et al. |
| 8,703,037 | B2 | 4/2014 | Hull et al. |
| 8,715,832 | B2 | 5/2014 | Ederer et al. |
| 8,718,522 | B2 | 5/2014 | Chillscyzn et al. |
| 8,737,862 | B2 | 5/2014 | Manico et al. |
| 8,741,194 | B1 | 6/2014 | Ederer et al. |
| 8,741,203 | B2 | 6/2014 | Liska et al. |
| 8,744,184 | B2 | 6/2014 | Ameline et al. |
| 8,761,918 | B2 | 6/2014 | Silverbrook |
| 8,801,418 | B2 | 8/2014 | El-Siblani et al. |
| 8,805,064 | B2 | 8/2014 | Ameline et al. |
| 8,815,143 | B2 | 8/2014 | John et al. |
| 8,844,133 | B2 | 9/2014 | Fuller |
| 8,845,316 | B2 | 9/2014 | Schillen et al. |
| 8,845,953 | B1 | 9/2014 | Balistreri et al. |
| 8,862,260 | B2 | 10/2014 | Shkolnik et al. |
| 8,872,024 | B2 | 10/2014 | Jamar et al. |
| 8,873,024 | B2 | 10/2014 | Jamar et al. |
| 8,876,513 | B2 | 11/2014 | Lim et al. |
| 8,877,115 | B2 | 11/2014 | Elsey |
| 8,888,480 | B2 | 11/2014 | Yoo et al. |
| 8,905,739 | B2 | 12/2014 | Vermeer et al. |
| 8,915,728 | B2 | 12/2014 | Mironets et al. |
| 8,926,304 | B1 | 1/2015 | Chen |
| 8,932,511 | B2 | 1/2015 | Napendensky |
| 8,968,625 | B2 | 3/2015 | Tan |
| 8,974,717 | B2 | 3/2015 | Maguire et al. |
| 8,991,211 | B1 | 3/2015 | Arlotti et al. |
| 8,992,816 | B2 | 3/2015 | Jonasson et al. |
| 8,998,601 | B2 | 4/2015 | Busato |
| 9,011,982 | B2 | 4/2015 | Muller et al. |
| 9,031,680 | B2 | 5/2015 | Napadensky |
| 9,063,376 | B2 | 6/2015 | Mizumura |
| 9,064,922 | B2 | 6/2015 | Nakajima et al. |
| 9,067,359 | B2 | 6/2015 | Rohner et al. |
| 9,067,360 | B2 | 6/2015 | Wehning et al. |
| 9,067,361 | B2 | 6/2015 | El-Siblani |
| 9,073,260 | B2 | 7/2015 | El-Siblani et al. |
| 9,079,357 | B2 | 7/2015 | Ebert et al. |
| 9,101,321 | B1 | 8/2015 | Kiesser |
| 9,149,986 | B2 | 10/2015 | Huang et al. |
| 9,150,032 | B2 | 10/2015 | Roof et al. |
| 9,153,052 | B2 | 10/2015 | Ameline et al. |
| 9,159,155 | B2 | 10/2015 | Andersen |
| 9,186,847 | B2 | 11/2015 | Fruth et al. |
| 9,193,112 | B2 | 11/2015 | Ohkusa et al. |
| 9,205,601 | B2 | 12/2015 | DeSimone et al. |
| 9,211,678 | B2 | 12/2015 | DeSimone et al. |
| 9,216,546 | B2 | 12/2015 | DeSimone et al. |
| 9,221,100 | B2 | 12/2015 | Schwarze et al. |
| 9,233,504 | B2 | 1/2016 | Douglas et al. |
| 9,248,600 | B2 | 2/2016 | Goodman et al. |
| 9,259,880 | B2 | 2/2016 | Chen |
| 9,308,690 | B2 | 4/2016 | Boyer et al. |
| 9,327,385 | B2 | 5/2016 | Webb et al. |
| 9,346,217 | B2 | 5/2016 | Huang et al. |
| 9,346,218 | B2 | 5/2016 | Chen et al. |
| 9,360,757 | B2 | 6/2016 | DeSimone et al. |
| 9,364,848 | B2 | 6/2016 | Silverbrook |
| 9,403,322 | B2 | 8/2016 | Das et al. |
| 9,403,324 | B2 | 8/2016 | Ederer et al. |
| 9,415,443 | B2 | 8/2016 | Ljungblad et al. |
| 9,415,544 | B2 | 8/2016 | Kerekes et al. |
| 9,415,547 | B2 | 8/2016 | Chen et al. |
| 9,429,104 | B2 | 8/2016 | Fuller |
| 9,434,107 | B2 | 9/2016 | Zenere |
| 9,446,557 | B2 | 9/2016 | Zenere et al. |
| 9,453,142 | B2 | 9/2016 | Rolland et al. |
| 9,456,884 | B2 | 10/2016 | Uckelmann et al. |
| 9,457,374 | B2 | 10/2016 | Hibbs et al. |
| 9,463,488 | B2 | 10/2016 | Ederer et al. |
| 9,469,074 | B2 | 10/2016 | Ederer et al. |
| 9,486,944 | B2 | 11/2016 | El-Siblani et al. |
| 9,486,964 | B2 | 11/2016 | Joyce |
| 9,487,443 | B2 | 11/2016 | Watanabe |
| 9,498,920 | B2 | 11/2016 | DeSimone et al. |
| 9,498,921 | B2 | 11/2016 | Teulet |

(56) References Cited

U.S. PATENT DOCUMENTS

| Patent/Pub No. | Date | Name |
|---|---|---|
| 9,511,546 B2 | 12/2016 | Chen et al. |
| 9,517,591 B2 | 12/2016 | Yoo et al. |
| 9,517,592 B2 | 12/2016 | Yoo et al. |
| 9,527,244 B2 | 12/2016 | El-Siblani |
| 9,527,272 B2 | 12/2016 | Steele |
| 9,529,371 B2 | 12/2016 | Nakamura |
| 9,533,450 B2 | 1/2017 | El-Siblani et al. |
| 9,539,762 B2 | 1/2017 | Durand et al. |
| 9,545,753 B2 | 1/2017 | Costabeber |
| 9,545,784 B2 | 1/2017 | Nakamura |
| 9,550,326 B2 | 1/2017 | Costabeber |
| 9,561,622 B2 | 2/2017 | Das et al. |
| 9,561,623 B2 | 2/2017 | El-Siblani et al. |
| 9,578,695 B2 | 2/2017 | Jerby et al. |
| 9,579,852 B2 | 2/2017 | Okamoto |
| 9,581,530 B2 | 2/2017 | Guthrie et al. |
| 9,592,635 B2 | 3/2017 | Ebert et al. |
| 9,604,411 B2 | 3/2017 | Rogren |
| 9,610,616 B2 | 4/2017 | Chen et al. |
| 9,616,620 B2 | 4/2017 | Hoechsmann et al. |
| 9,632,037 B2 | 4/2017 | Chen et al. |
| 9,632,420 B2 | 4/2017 | Allanic |
| 9,632,983 B2 | 4/2017 | Ueda et al. |
| 9,636,873 B2 | 5/2017 | Joyce |
| 9,649,812 B2 | 5/2017 | Hartmann et al. |
| 9,649,815 B2 | 5/2017 | Atwood et al. |
| 9,670,371 B2 | 6/2017 | Pervan et al. |
| 9,676,143 B2 | 6/2017 | Kashani-Shirazi |
| 9,676,963 B2 | 6/2017 | Rolland et al. |
| 9,682,166 B2 | 6/2017 | Watanabe |
| 9,682,425 B2 | 6/2017 | Xu et al. |
| 9,688,027 B2 | 6/2017 | Batchelder et al. |
| 9,707,720 B2 | 7/2017 | Chen et al. |
| 9,720,363 B2 | 8/2017 | Chillscyzn et al. |
| 9,738,034 B2 | 8/2017 | Gruber et al. |
| 9,738,564 B2 | 8/2017 | Capobianco et al. |
| 9,751,292 B2 | 9/2017 | Jamar et al. |
| 9,764,513 B2 | 9/2017 | Stampfl et al. |
| 9,764,535 B2 | 9/2017 | Xie et al. |
| 9,821,546 B2 | 11/2017 | Schaafsma et al. |
| 9,862,146 B2 | 1/2018 | Driessen et al. |
| 9,862,150 B2 | 1/2018 | Chen et al. |
| 9,868,255 B2 | 1/2018 | Comb et al. |
| 9,885,987 B2 | 2/2018 | Chillscyzn et al. |
| 9,895,843 B2 | 2/2018 | Lobovsky et al. |
| 9,901,983 B2 | 2/2018 | Hovel et al. |
| 9,908,293 B2 | 3/2018 | Yoo et al. |
| 9,919,474 B2 | 3/2018 | Napadensky |
| 9,919,515 B2 | 3/2018 | Daniell et al. |
| 9,950,368 B2 | 4/2018 | Lampenscherf et al. |
| 9,956,727 B2 | 5/2018 | Steele |
| 9,962,767 B2 | 5/2018 | Buller et al. |
| 9,981,411 B2 | 5/2018 | Green et al. |
| 10,000,023 B2 | 6/2018 | El-Siblani et al. |
| 10,011,076 B2 | 7/2018 | El-Siblani et al. |
| 10,061,302 B2 | 8/2018 | Jacobs et al. |
| 10,071,422 B2 | 9/2018 | Buller et al. |
| 10,124,532 B2 | 11/2018 | El-Siblani et al. |
| 10,150,254 B2 | 12/2018 | Bauman et al. |
| 10,155,345 B2 | 12/2018 | Ermoshkin et al. |
| 10,155,882 B2 | 12/2018 | Rolland et al. |
| 10,183,330 B2 | 1/2019 | Buller et al. |
| 10,183,444 B2 | 1/2019 | Campbell |
| 10,240,066 B2 | 3/2019 | Rolland et al. |
| 10,245,784 B2 | 4/2019 | Teken et al. |
| 10,317,882 B2 | 6/2019 | de Pena et al. |
| 10,336,055 B2 | 7/2019 | Das et al. |
| 10,336,057 B2 | 7/2019 | Moore et al. |
| 10,350,823 B2 | 7/2019 | Rolland et al. |
| 10,357,956 B2 | 7/2019 | Usami et al. |
| 10,406,748 B2 | 9/2019 | Honda |
| 10,612,112 B2 | 4/2020 | Yang et al. |
| 10,639,843 B2 | 5/2020 | Yuan et al. |
| 10,682,808 B2 | 6/2020 | Fujita et al. |
| 10,695,988 B2 | 6/2020 | Hanyu et al. |
| 10,717,212 B2 | 7/2020 | Parkinson et al. |
| 10,737,479 B2 | 8/2020 | El-Siblani et al. |
| 10,994,941 B1 | 5/2021 | Dwivedi et al. |
| 11,179,891 B2 | 11/2021 | Dubelman et al. |
| 2002/0164069 A1 | 11/2002 | Nagano et al. |
| 2003/0102682 A1 | 6/2003 | Kurokawa |
| 2003/0180171 A1 | 9/2003 | Artz et al. |
| 2003/0209836 A1 | 11/2003 | Sherwood |
| 2004/0042789 A1 | 3/2004 | Puffer, Jr. et al. |
| 2005/0012239 A1 | 1/2005 | Nakashima |
| 2005/0019016 A1 | 1/2005 | Nakashika et al. |
| 2005/0056677 A1 | 3/2005 | Talken |
| 2006/0132735 A1* | 6/2006 | Lof .................. G03F 7/70291 355/72 |
| 2006/0230984 A1 | 10/2006 | Bredt et al. |
| 2006/0248062 A1 | 11/2006 | Libes et al. |
| 2007/0063366 A1 | 3/2007 | Cunningham et al. |
| 2007/0116937 A1 | 5/2007 | Lazzerini |
| 2008/0170112 A1 | 7/2008 | Hull et al. |
| 2008/0179787 A1 | 7/2008 | Sperry et al. |
| 2008/0224352 A1 | 9/2008 | Narukawa et al. |
| 2008/0241404 A1 | 10/2008 | Allaman et al. |
| 2009/0092742 A1* | 4/2009 | Teramoto .................. B05D 1/28 427/172 |
| 2009/0146344 A1 | 6/2009 | El-Siblani |
| 2009/0324884 A1* | 12/2009 | Nishi .................. B29C 55/023 428/137 |
| 2010/0003619 A1 | 1/2010 | Das et al. |
| 2010/0128239 A1* | 5/2010 | Iino .................. G03F 7/70791 355/77 |
| 2010/0196694 A1 | 8/2010 | Yamazaki et al. |
| 2010/0290016 A1 | 11/2010 | Kaehr et al. |
| 2011/0089610 A1 | 4/2011 | El-Siblani et al. |
| 2011/0101570 A1 | 5/2011 | John et al. |
| 2011/0162989 A1 | 7/2011 | Ducker et al. |
| 2011/0207057 A1 | 8/2011 | Hull et al. |
| 2012/0007287 A1 | 1/2012 | Vermeer et al. |
| 2012/0195994 A1 | 8/2012 | El-Siblani et al. |
| 2012/0292800 A1 | 11/2012 | Higuchi et al. |
| 2012/0313294 A1 | 12/2012 | Vermeer et al. |
| 2013/0008879 A1 | 1/2013 | Bichsel |
| 2013/0052332 A1 | 2/2013 | Roof et al. |
| 2013/0140741 A1 | 6/2013 | El-Siblani et al. |
| 2013/0241113 A1 | 9/2013 | Geers et al. |
| 2014/0099476 A1 | 4/2014 | Subramanian et al. |
| 2014/0103581 A1 | 4/2014 | Das et al. |
| 2014/0191442 A1 | 7/2014 | Elsey |
| 2014/0200865 A1 | 7/2014 | Lehmann et al. |
| 2014/0239554 A1 | 8/2014 | El-Siblani et al. |
| 2014/0246813 A1 | 9/2014 | Bauman et al. |
| 2014/0275317 A1 | 9/2014 | Moussa |
| 2014/0319735 A1 | 10/2014 | El-Siblani et al. |
| 2014/0322374 A1 | 10/2014 | El-Siblani et al. |
| 2014/0332507 A1 | 11/2014 | Fockele |
| 2014/0339741 A1 | 11/2014 | Aghababaie et al. |
| 2014/0348691 A1 | 11/2014 | Ljungblad et al. |
| 2014/0348692 A1 | 11/2014 | Bessac et al. |
| 2015/0004042 A1 | 1/2015 | Nimal |
| 2015/0004046 A1 | 1/2015 | Graham et al. |
| 2015/0056365 A1 | 2/2015 | Miyoshi |
| 2015/0086409 A1 | 3/2015 | Hellestam |
| 2015/0102531 A1 | 4/2015 | El-Siblani et al. |
| 2015/0104563 A1 | 4/2015 | Lowe et al. |
| 2015/0140152 A1 | 5/2015 | Chen |
| 2015/0140155 A1 | 5/2015 | Ohno et al. |
| 2015/0145174 A1 | 5/2015 | Comb |
| 2015/0158111 A1 | 6/2015 | Schwarze et al. |
| 2015/0165695 A1 | 6/2015 | Chen et al. |
| 2015/0210013 A1 | 7/2015 | Teulet |
| 2015/0224710 A1 | 8/2015 | El-Siblani |
| 2015/0231798 A1 | 8/2015 | Goto |
| 2015/0231828 A1 | 8/2015 | El-Siblani et al. |
| 2015/0231831 A1 | 8/2015 | El-Siblani |
| 2015/0246487 A1 | 9/2015 | El-Siblani |
| 2015/0251351 A1 | 9/2015 | Feygin |
| 2015/0266237 A1 | 9/2015 | Comb et al. |
| 2015/0268099 A1 | 9/2015 | Craig et al. |
| 2015/0298396 A1 | 10/2015 | Chen et al. |
| 2015/0301517 A1 | 10/2015 | Chen et al. |

(56) References Cited

U.S. PATENT DOCUMENTS

| | | |
|---|---|---|
| 2015/0306819 A1 | 10/2015 | Ljungblad |
| 2015/0306825 A1 | 10/2015 | Chen et al. |
| 2015/0321421 A1 | 11/2015 | Ding |
| 2015/0352668 A1 | 12/2015 | Scott et al. |
| 2015/0352791 A1 | 12/2015 | Chen et al. |
| 2015/0355553 A1 | 12/2015 | Allanic |
| 2015/0375452 A1 | 12/2015 | Huang et al. |
| 2016/0016361 A1 | 1/2016 | Lobovsky et al. |
| 2016/0031010 A1 | 2/2016 | O'Neill et al. |
| 2016/0046075 A1 | 2/2016 | DeSimone et al. |
| 2016/0046080 A1 | 2/2016 | Thomas et al. |
| 2016/0052205 A1 | 2/2016 | FrantzDale |
| 2016/0059484 A1 | 3/2016 | DeSimone et al. |
| 2016/0059485 A1 | 3/2016 | Ding et al. |
| 2016/0067921 A1 | 3/2016 | Willis et al. |
| 2016/0082662 A1 | 3/2016 | Majer |
| 2016/0082671 A1 | 3/2016 | Joyce |
| 2016/0096332 A1 | 4/2016 | Chen et al. |
| 2016/0107340 A1 | 4/2016 | Joyce |
| 2016/0107383 A1 | 4/2016 | Dikovsky et al. |
| 2016/0107387 A1 | 4/2016 | Ooba et al. |
| 2016/0129631 A1 | 5/2016 | Chen et al. |
| 2016/0137839 A1 | 5/2016 | Rolland et al. |
| 2016/0167160 A1 | 6/2016 | Hellestam |
| 2016/0176114 A1 | 6/2016 | Tsai et al. |
| 2016/0184931 A1 | 6/2016 | Green |
| 2016/0193785 A1 | 7/2016 | Bell et al. |
| 2016/0200052 A1 | 7/2016 | Moore et al. |
| 2016/0214327 A1 | 7/2016 | Ucklemann et al. |
| 2016/0221262 A1 | 8/2016 | Das et al. |
| 2016/0223117 A1 | 8/2016 | Hitzelberger |
| 2016/0243649 A1 | 8/2016 | Zheng et al. |
| 2016/0303798 A1 | 10/2016 | Mironets et al. |
| 2016/0332386 A1 | 11/2016 | Kuijpers |
| 2016/0361871 A1 | 12/2016 | Jeng et al. |
| 2016/0361872 A1 | 12/2016 | El-Siblani |
| 2017/0008234 A1 | 1/2017 | Cullen et al. |
| 2017/0008236 A1 | 1/2017 | Easter et al. |
| 2017/0021562 A1 | 1/2017 | El-Siblani et al. |
| 2017/0066185 A1 | 3/2017 | Ermoshkin et al. |
| 2017/0066196 A1 | 3/2017 | Beard et al. |
| 2017/0072635 A1 | 3/2017 | El-Siblani et al. |
| 2017/0080641 A1 | 3/2017 | El-Siblani |
| 2017/0087670 A1 | 3/2017 | Kalentics et al. |
| 2017/0100895 A1 | 4/2017 | Chou et al. |
| 2017/0100897 A1 | 4/2017 | Chou et al. |
| 2017/0100899 A1 | 4/2017 | El-Siblani et al. |
| 2017/0102679 A1 | 4/2017 | Greene et al. |
| 2017/0113409 A1 | 4/2017 | Patrov |
| 2017/0120332 A1 | 5/2017 | DeMuth et al. |
| 2017/0120333 A1 | 5/2017 | DeMuth et al. |
| 2017/0120334 A1 | 5/2017 | DeMuth et al. |
| 2017/0120335 A1 | 5/2017 | DeMuth et al. |
| 2017/0120336 A1 | 5/2017 | DeMuth et al. |
| 2017/0120387 A1 | 5/2017 | DeMuth et al. |
| 2017/0120518 A1 | 5/2017 | DeMuth et al. |
| 2017/0120529 A1 | 5/2017 | DeMuth et al. |
| 2017/0120530 A1 | 5/2017 | DeMuth et al. |
| 2017/0120537 A1 | 5/2017 | DeMuth et al. |
| 2017/0120538 A1 | 5/2017 | DeMuth et al. |
| 2017/0123222 A1 | 5/2017 | DeMuth et al. |
| 2017/0123237 A1 | 5/2017 | DeMuth et al. |
| 2017/0136688 A1 | 5/2017 | Knecht et al. |
| 2017/0136708 A1 | 5/2017 | Das et al. |
| 2017/0157841 A1 | 6/2017 | Green |
| 2017/0157862 A1 | 6/2017 | Bauer |
| 2017/0165916 A1 | 6/2017 | El-Siblani |
| 2017/0173865 A1 | 6/2017 | Dikovsky et al. |
| 2017/0182708 A1 | 6/2017 | Lin et al. |
| 2017/0190120 A1 | 7/2017 | Bloome et al. |
| 2017/0276651 A1 | 9/2017 | Hall |
| 2017/0284971 A1 | 10/2017 | Hall |
| 2017/0291804 A1 | 10/2017 | Craft et al. |
| 2017/0297108 A1 | 10/2017 | Gibson et al. |
| 2017/0297109 A1 | 10/2017 | Gibson et al. |
| 2017/0297261 A1 | 10/2017 | Schultheiss et al. |
| 2017/0305136 A1 | 10/2017 | Elsey |
| 2017/0326786 A1 | 11/2017 | Yuan et al. |
| 2017/0326807 A1 | 11/2017 | Greene et al. |
| 2017/0334209 A1* | 11/2017 | Nakano ................ B41J 2/16538 |
| 2017/0368816 A1 | 12/2017 | Batchelder et al. |
| 2018/0001567 A1 | 1/2018 | Juan et al. |
| 2018/0015672 A1 | 1/2018 | Shusteff et al. |
| 2018/0043619 A1 | 2/2018 | Kim et al. |
| 2018/0056585 A1 | 3/2018 | Du Toit |
| 2018/0056604 A1 | 3/2018 | Sands et al. |
| 2018/0079137 A1 | 3/2018 | Herzog et al. |
| 2018/0085998 A1 | 3/2018 | von Burg |
| 2018/0117790 A1 | 5/2018 | Yun |
| 2018/0134029 A1 | 5/2018 | Myerberg et al. |
| 2018/0162045 A1 | 6/2018 | Guimbretiere |
| 2018/0169969 A1 | 6/2018 | Deleon et al. |
| 2018/0200948 A1 | 7/2018 | Kuijpers et al. |
| 2018/0201021 A1 | 7/2018 | Beaver et al. |
| 2018/0229332 A1 | 8/2018 | Tsai et al. |
| 2018/0229436 A1 | 8/2018 | Gu et al. |
| 2018/0272603 A1 | 9/2018 | MacCormack et al. |
| 2018/0272608 A1 | 9/2018 | Yun |
| 2018/0304369 A1 | 10/2018 | Myerberg et al. |
| 2018/0345600 A1 | 12/2018 | Holford et al. |
| 2018/0370214 A1 | 12/2018 | Comb et al. |
| 2019/0022937 A1 | 1/2019 | Stelter et al. |
| 2019/0039299 A1 | 2/2019 | Busbee et al. |
| 2019/0047211 A1 | 2/2019 | Herring et al. |
| 2019/0061230 A1 | 2/2019 | Ermoshkin et al. |
| 2019/0112499 A1 | 4/2019 | Rolland et al. |
| 2019/0126533 A1 | 5/2019 | Thompson |
| 2019/0126548 A1 | 5/2019 | Barnhart et al. |
| 2019/0146344 A1 | 5/2019 | Shimoaoki et al. |
| 2019/0232369 A1 | 8/2019 | Strobner et al. |
| 2019/0232550 A1 | 8/2019 | Mark et al. |
| 2019/0240932 A1 | 8/2019 | Graf |
| 2019/0263054 A1 | 8/2019 | Kotler et al. |
| 2019/0270254 A1 | 9/2019 | Mark et al. |
| 2019/0283316 A1 | 9/2019 | Rolland et al. |
| 2019/0299524 A1 | 10/2019 | Hill et al. |
| 2019/0344381 A1 | 11/2019 | Pomerantz et al. |
| 2019/0389137 A1 | 12/2019 | Frohnmaier et al. |
| 2020/0001398 A1 | 1/2020 | Mellor et al. |
| 2020/0001525 A1 | 1/2020 | Wynne et al. |
| 2020/0039142 A1 | 2/2020 | Childers |
| 2020/0079008 A1 | 3/2020 | Chowdry et al. |
| 2020/0079017 A1 | 3/2020 | MacNeish, III et al. |
| 2020/0101564 A1 | 4/2020 | Shibazaki |
| 2020/0108553 A1 | 4/2020 | Rogren |
| 2020/0164437 A1 | 5/2020 | Goth et al. |
| 2020/0198224 A1 | 6/2020 | Dubelman et al. |
| 2020/0230938 A1 | 7/2020 | Menchik et al. |
| 2020/0238624 A1 | 7/2020 | Dubelman et al. |
| 2020/0247040 A1 | 8/2020 | Green |
| 2020/0262150 A1 | 8/2020 | Dubelman et al. |
| 2020/0290275 A1 | 9/2020 | Dubelman et al. |
| 2020/0298485 A1 | 9/2020 | Tsai |
| 2020/0307075 A1 | 10/2020 | Mattes et al. |
| 2020/0307100 A1 | 10/2020 | Sabo |
| 2020/0376775 A1 | 12/2020 | Das et al. |
| 2021/0023776 A1 | 1/2021 | Van Esbroeck et al. |
| 2021/0046695 A1 | 2/2021 | Thompson et al. |
| 2021/0141269 A1* | 5/2021 | Nagata ................ B32B 37/003 |
| 2021/0156779 A1 | 5/2021 | Medalsy |
| 2021/0187859 A1 | 6/2021 | Gmeiner et al. |
| 2021/0387420 A1* | 12/2021 | Greene ................ B29C 64/282 |
| 2021/0402677 A1 | 12/2021 | Khusnatdinov et al. |
| 2022/0001525 A1 | 1/2022 | Panetta et al. |
| 2022/0088868 A1 | 3/2022 | Duoss et al. |
| 2022/0161488 A1 | 5/2022 | Dubelman et al. |
| 2022/0339859 A1 | 10/2022 | Steele et al. |
| 2022/0402198 A1 | 12/2022 | Thompson et al. |
| 2022/0402212 A1 | 12/2022 | Dubelman et al. |
| 2022/0410481 A1 | 12/2022 | Muhlenkamp et al. |
| 2022/0410482 A1 | 12/2022 | Dubelman et al. |
| 2022/0410486 A1 | 12/2022 | Liu et al. |
| 2023/0012168 A1 | 1/2023 | Dubelman et al. |

(56) References Cited

U.S. PATENT DOCUMENTS

| | | |
|---|---|---|
| 2023/0050127 A1 | 2/2023 | Duebelman et al. |
| 2023/0064479 A1 | 3/2023 | Barnhill et al. |
| 2023/0067394 A1 | 3/2023 | Barnhill et al. |

FOREIGN PATENT DOCUMENTS

| | | |
|---|---|---|
| CN | 104175559 A | 12/2014 |
| CN | 105711101 A | 6/2016 |
| CN | 105773962 A | 7/2016 |
| CN | 107322930 A | 11/2017 |
| CN | 208946717 U | 6/2019 |
| CN | 109968661 A | 7/2019 |
| CN | 111497231 A | 8/2020 |
| DE | 102007010624 A1 | 9/2008 |
| EP | 448459 A1 | 9/1991 |
| EP | 557051 A1 | 8/1993 |
| EP | 1454831 B1 | 9/2004 |
| EP | 1864785 A1 | 12/2007 |
| EP | 3053729 A1 | 8/2016 |
| EP | 3453521 A1 | 3/2019 |
| EP | 3356121 B1 | 10/2020 |
| GB | 2311960 A | 10/1997 |
| JP | H06246839 A | 9/1994 |
| JP | H07164534 A | 6/1995 |
| JP | 2002370286 A | 12/2002 |
| JP | 2003039564 A | 2/2003 |
| JP | 2014090210 A | 5/2014 |
| JP | 2016/196098 A | 11/2016 |
| KR | 20170108729 A | 9/2017 |
| KR | 102109664 B1 | 5/2020 |
| WO | WO9600422 A1 | 1/1996 |
| WO | WO9806560 | 2/1998 |
| WO | WO0100390 A1 | 1/2001 |
| WO | WO2006/077665 A1 | 7/2006 |
| WO | WO2006/109355 A1 | 10/2006 |
| WO | WO2017009368 | 1/2017 |
| WO | WO2017/098968 A1 | 6/2017 |
| WO | WO2017/100538 A1 | 6/2017 |
| WO | WO2019/159936 A1 | 8/2019 |
| WO | WO2020/033607 A1 | 2/2020 |
| WO | WO2020/185553 A1 | 9/2020 |

OTHER PUBLICATIONS

Carbon, Carbon SpeedCell: Additive Manufacturing Reinvented, Redwood City California, Mar. 16, 2017, 4 Pages. Retrieved from Webpage: https://www.carbon3d.com/news/carbon-speedcell-additive manufacturing-reinvented/.
Carbon, The 3D Printer for Products that Outperform, 8 Pages. Retrieved from Webpage: https://www.carbon3d.com.
DDM Systems, Disruptive Technologies for Additive Manufacturing, 2014. Retrieved on Jul. 7, 2020 from Web Link: http://www.ddmsys.com/.
Designing Buildings Wiki, Types of Brick Bonding, 6 Pages. Retrieved Mar. 25, 2021 from Webpage: https://www.designingbuildings.co.uk/wiki/Types_of_brick_bonding.
Doctor Blade with Micrometer Screw Gauge, The Tape Casting Warehouse, Inc., Morrisville PA, 6 Pages. Retrieved Mar. 23, 2021 from Webpage: https://www.drblade.com/.
Envisiontec, Advanced DLP for Superior 3D Printing, Mar. 9, 2017, 8 Pages. https://envisiontec.com/wp-content/uploads/2016/12/Why-EnvisionTEC-DLP-3D-Printing-is-Better-rebranded.pdf.
Feng et al., Exposure Reciprocity Law in Photopolymerization of Multi-Functional Acrylates and Methacrylates, Macromolecular Chemistry and Physics, vol. 208, 2007, pp. 295-306.
Formlabs, An Introduction to Post-Curing Sla 3D Prints, 8 Pages. Retrieved from Webpage: https://formlabs.com/blog/introduction~post~curing~sla~3d~prints.
Formlabs, Form Wash & Form Cure, 8 Pages. Retrieved from Webpage: https://formlabs.com/tools/wash-cure/.

Hafkamp et al., A Feasibility Study on Process Monitoring and Control in Vat Photopolymerization of Ceramics, Mechatronics, vol. 56, The Netherlands, Dec. 2018, pp. 220-241. Retrieved from https://doi.org/10.1016/j.mechatronics.2018.02.006.
KUDO3D, Post-Process Your SLA Prints in 4 Easy Steps, 8 Pages. Retrieved from Webpage: https://www.kudo3d.com/post-process-your-sla-prints-in-4-easy-steps/.
Leap, Low-Frequency Sonic Mixing Technology, Energy Efficiency & Renewable Energy, Energy.Gov, 5 Pages. Retrieved Mar. 17, 2021 from Webpage: https://www.energy.gov/eere/amo/low-frequency-sonic-mixing-technology.
Lee et al., Development of a 3D Printer Using Scanning Projection Stereolithography, Scientific Reports, vol. 5, Article No. 9875, 2015, 5 pages. https://www.nature.com/articles/srep09875#sl.
Lee et al., Large-Area Compatible Laser Sintering Schemes with a Spatially Extended Focused Beam, Journal, Micromachines, vol. 8, No. 153, Seoul University, Seoul Korea, May 11, 2017, 8 Pages. http://dx.doi.org/10.3390/mi8050153.
Limaye, Multi-Objective Process Planning Method for Mask Projection Stereolithography, Dissertation Georgia Institute of Technology, Dec. 2007, 324 Pages.
Lithoz, CeraCleaning Station Ultra Technical Data, 2 Pages.
Matthews et al., Diode-Based Additive Manufacturing of Metals Using an Optically-Addressable Light Valve, Optic Express Research Article, vol. 25, No. 10, Lawrence Livermore National Laboratory, Livermore CA, May 10, 2017.
MICRON3D, Cleaning of Printed Models, YouTube, Dec. 5, 2016, 1 Page. Retrieved from Webpage: https://www.youtube.com/watch?v=soAlrSs1iBY.
Nussbaum et al., Evaluation of Processing Variables in Large Area Polymer Sintering of Single Layer Components, Solid Freeform Fabrication 2016: Proceedings of the 27$^{th}$ Annual International Solid Freeform Fabracation Symposium-An Additive Manufacturing Conference Reviewed Paper, University of South Florida, Tampa Florida.
Omegasonics, Ultrasonic Cleaning of 3D Printer Parts, YouTube, Feb. 26, 2014, 1 Page. Retrieved from Webpage: https://www.youtube.com/watch?y=Gxi47OS5ohk.
Park et al., Development of Multi-Material DLP 3D Printer, Journal of the Korean Society of Manufacturing Technology Engineers, vol. 26, Issue 1, Seoul Korea, Feb. 15, 2017, pp. 100-107. https://doi.org/10.7735/ksmte.2017.26.1.100.
Prodways Tech, Prodways Movinglight Technology Retrieved on Jul. 2, 2020 from Web Link: https://www.prodways.com/en/the-prodways-movinglight-technology/.
Ramco Equipment Corporation, Ramco RamTough-Fully Automated Wash/Rinse/Dry System, YouTube, Jul. 9, 2013, 1 Page. Retrieved from Webpage: https://www.youtube.com/watch?v=i8S5Oc3FVFU.
Ricoh Imaging Company Ltd., The Advanced Pixel Shift Resolution System II for Super-High-Resolution Images, Pentax K-1 Mark II, Pixel Shift Resolution System, 4 Pages. Retrieved on Mar. 30, 2021 from Webpage: http://www.ricoh-imaging.co.jp/english/products/k-1-2/feature/02.html.
Sonics & Materials, Inc., Ultrasonic Food Cutting Equipment, Sonics & Materials, Inc., Retrieved on Jun. 26, 2020, 4 Pages. https://www.sonics.com/food-cutting.
Stemmer Imaging, Ultra-High Resolution for Industrial Imaging, Germany, 9 Pages. Retrieved on Mar. 30, 2021 from Webpage: https://www.stemmer-imaging.com/en/knowledge-base/pixel-shift-technology/.
Stevenson, Admatec's Ceramic 3D Printers, Ceramic, Metal, Fabbaloo 3D Printing News, Jan. 21, 2019, 8 Pages. Retrieved Nov. 24, 2020 from Weblink: https://www.fabbaloo.com/blog/2019/1/21/admatecs-ceramic-3d-printers.
Techmetals, Electroless Nickel (TM 117C), Engineered Metal Finishing & Performance Coatings, 1 Page. Retrieved from Webpage: https://techmetals.com/pdfs/TM_117C.pdfhttps://techmetals.com/tm117c-2/.
Telsonic Ultrasonics, Cutting Awning Fabrics and Sealing the Edge, The Powerhouse of Ultrasonics, 2017, 1 Page. https://www.telsonic.com/fileadmin/applications/AS_206_Cut_Seal_Markisengewebe_EN.pdf.

(56) References Cited

OTHER PUBLICATIONS

Telsonic Ultrasonics, Integrated Power Actuator—IPA 3505, Telsonic Ultrasonics, Retrieved Jun. 26, 2020, 2 Pages. https://www.telsonic.com/en/products/integrated-power-actuator-ipa-3505/.
Tok et al., Tape Casting of High Dielectric Ceramic Substrates for Microelectronics Packaging, Journal of Materials Engineering and Performance, vol. 8, 1999, pp. 469-472. (Abstract Only) https://link.springer.com/article/10.1361/105994999770346783.
Wikipedia, Pixel Shifting, 2 Pages. Retrieved Mar. 30, 2021 from Webpage: https://en.wikipedia.org/wiki/Pixel_shifting.
Wikipedia, Standing Wave, 11 Pages. Retrieved Mar. 17, 2021 from Webpage: https://en.wikipedia.org/wiki/Standing_wave.
Extended European Search Report for Application No. 25164667.5 dated Jul. 29, 2025 (8 pages).

\* cited by examiner

ACCUMALATOR ASSEMBLY FOR ADDITIVE MANUFACTURING

CROSS-REFERENCE TO RELATED APPLICATION

This application claims priority to U.S. Non-Provisional application Ser. No. 17/186,685, entitled "ACCUMULATOR ASSEMBLY FOR ADDITIVE MANUFACTURING," filed on Feb. 26, 2021. The entire contents of the above-referenced application is hereby incorporated by reference in its entirety for all purposes.

FIELD

The present subject matter relates generally to an additive manufacturing apparatus, and more particularly to assemblies for retaining and interacting with a foil of the additive manufacturing apparatus.

BACKGROUND

Additive manufacturing is a process in which material is built up layer-by-layer to form a component. Stereolithography (SLA) is a type of additive manufacturing process that employs a tank of radiant-energy curable photopolymer "resin" and a curing energy source such as a laser. Similarly, Digital Light Processing (DLP) three-dimensional (3D) printing employs a two-dimensional image projector to build components one layer at a time. For each layer, the energy source draws or flashes a radiation image of the cross section of the component onto the surface of the resin or through a radiotransparent portion of a resin support. Exposure to the radiation cures and solidifies the pattern in the resin and joins it to a previously cured layer.

In some instances, additive manufacturing may be accomplished through a "tape casting" process. In this process, a resin is deposited onto a flexible radiotransparent tape or foil that is fed out from a supply reel to a build zone. Radiant energy is used to cure the resin to a component that is supported by a stage in the build zone. Once the curing of the first layer is complete, the stage and the foil are separated from one another. The foil is then advanced and fresh resin is provided to the build zone. In turn, the first layer of the cured resin is placed onto the fresh resin and cured through the energy device to form an additional layer of the component. Subsequent layers are added to each previous layer until the component is completed.

During the tape casting process, various processes may occur simultaneously within an additive manufacturing apparatus. Accordingly, it may be beneficial for various portions of the foil to move at different speeds and/or for a portion of the foil to move intermittently while other portions generally move continuously. As such, an accumulator device that is capable of creating additional functionality for additive manufacturing would be beneficial.

BRIEF DESCRIPTION

Aspects and advantages of the invention will be set forth in part in the following description, or may be obvious from the description, or may be learned through practice of the invention.

In some embodiments of the present disclosure, an additive manufacturing apparatus includes a feed module configured to operably couple with a first end portion of a foil. A take-up module is configured to operably couple with a second end portion of a foil. At least one stage is configured to hold one or more cured layers of a resin that form a component. A radiant energy device is positioned opposite to the at least one stage. The radiant energy device is operable to generate and project radiant energy in a predetermined pattern. An actuator is configured to change a relative position of the at least one stage and the foil. An accumulator is positioned between the feed module and the take-up module. The accumulator is configured to retain an intermediate portion of the foil to allow a first portion of the foil upstream of the accumulator to move at a first speed and a second portion of the foil downstream of the accumulator to move at a second speed during a defined time period.

In some embodiments of the present disclosure, a method of operating an additive manufacturing apparatus is provided herein. The method includes moving a first portion of a foil a first distance during a defined time period. The first portion of the foil is positioned upstream of an accumulator. The method also includes moving a second portion of the foil a second distance during the defined time period. The second portion of the foil is positioned downstream of the accumulator. Moreover, the second distance is different from the first distance.

In some embodiments of the present disclosure, an additive manufacturing apparatus includes a feed module configured to operably couple with a first end portion of a foil. A take-up module is configured to operably couple with a second end portion of a foil. A stage is configured to hold one or more cured layers of a resin that form a component. A radiant energy device is positioned opposite to the stage. The radiant energy device is operable to generate and project radiant energy in a predetermined pattern. An actuator is configured to change a relative position of the stage and the foil. A reclamation system is configured to remove at least a portion of the resin from the foil. An accumulator is positioned between the stage and the reclamation system.

These and other features, aspects, and advantages of the present disclosure will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present disclosure, including the best mode thereof, directed to one of ordinary skill in the art, is set forth in the specification, which makes reference to the appended figures.

Figure 1:
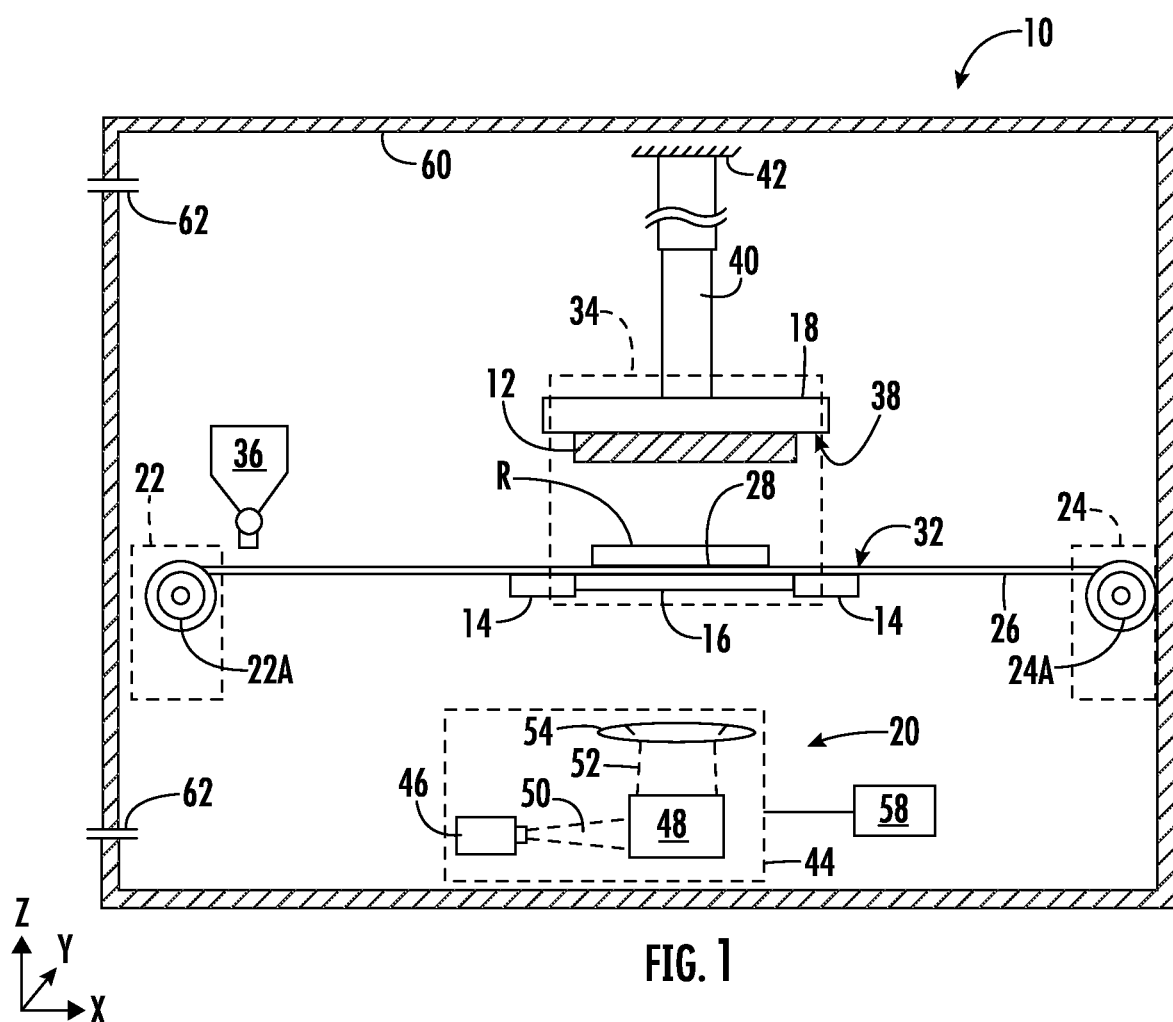
FIG. 1 is a schematic side view of an additive manufacturing apparatus in accordance with various aspects of the present disclosure.

Repeat use of reference characters in the present specification and drawings is intended to represent the same or analogous features or elements of the present disclosure.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first," "second," and "third" may be used interchangeably to distinguish one component from another and are not intended to signify a location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein. The terms "upstream" and "downstream" refer to the relative direction with respect to a foil (or resin support) movement along the manufacturing apparatus. For example, "upstream" refers to the direction from which the foil moves, and "downstream" refers to the direction to which the foil moves. As used herein, the term "selectively" refers to a component's ability to operate in various states (e.g., an ON state and an OFF state) based on manual and/or automatic control of the component.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

The present disclosure is generally directed to an additive manufacturing apparatus that implements various manufacturing processes such that successive layers of material(s) are provided on each other to "build-up," layer-by-layer, a three-dimensional component. The successive layers generally cure together to form a monolithic component which may have a variety of integral sub-components. Although additive manufacturing technology is described herein as enabling the fabrication of complex objects by building objects point-by-point, layer-by-layer, typically in a vertical direction, variations of the described additive manufacturing apparatus and technology are possible and within the scope of the present subject matter.

The additive manufacturing apparatus can include a support plate, a window supported by the support plate, and a stage moveable relative to the window. The additive manufacturing apparatus can further include a flexible tape or foil that supports a resin. A radiant energy device is configured to cure a portion of the resin forming a layer of the component, which is translated towards and away from the foil by stage between successive curing operations.

In some instances, a feed module is configured to operably couple with a first end portion of a foil and a take-up module is configured to operably couple with a second end portion of a foil. The build zone may be positioned between the feed module and the take-up module. An accumulator may be positioned between the feed module and the take-up module and configured to alter the relative movement of a first portion of the foil upstream of the accumulator from a second portion of the foil downstream of the accumulator. For example, the first portion of the foil may be translated at a first speed while the second portion is translated at a second speed that is different from the first speed. As used herein, the "speed" of the foil may be a measurement of each portion of a foil (or other component) at a defined time period. The defined time period may be a predefined moment during a build process, such as when the foil is translated through at least one build zone, and/or at any other time during operation of the apparatus. Additionally, the defined time period may be a defined amount of time in which the speed of the foil is averaged over the amount of time. For example, the defined amount of time may be one second or any other amount of time. Further, when the speed of the foil is upstream of the accumulator, the speed may be measured at any point between the feed module and the accumulator. Likewise, when the speed of the foil is downstream of the accumulator, the speed may be measured at any point between the accumulator and the take-up module and/or a subsequent accumulator downstream of the first accumulator. Lastly, it will be appreciated that the speed of the foil within the accumulator may be varied from that of the speed of the foil upstream of the accumulator and/or downstream of the accumulator by altering an amount of foil within the accumulator. In instances in which the amount of foil within the accumulator is varied, the speed of the foil may be measured at any defined position within the accumulator. However, when not defined, the default position at which the speed of the foil within the accumulator is measured is a point at which the foil exits a cavity of the accumulator.

Additionally, or alternatively, one of the first or second portion of the foil may move continuously while the other of the first or second portion of the foil moves intermittently during a predefined time period. In some instances, the predefined time period may be an amount of time between at least two curing steps within a build zone. As various portions of the foil move independently, simultaneous processes may be occurring within the apparatus. For example, a curing process may be occurring on a first portion of the foil while a resin reclamation process is occurring on the second portion of the foil. By moving the first and second portions of the foil independently, at least during various portions of operation, the speed at which a component is printed may be increased, and/or any of the processes may be accomplished more efficiently.

Referring to the drawings wherein identical reference numerals denote the similar elements throughout the various views, FIG. 1 schematically illustrates an example of one type of suitable apparatus 10 for forming a component 12 created through one or more layers of cured resin R. The apparatus 10 can include one or more of a support plate 14, a window 16, a stage 18 that is movable relative to the window 16, and a radiant energy device 20, which, in combination, may be used to form any number (e.g., one or more) of additively manufactured components 12.

In the illustrated example, the apparatus 10 includes a feed module 22, which may include a first roller 22A, and a take-up module 24, which may include a second roller 24A, that are spaced-apart and configured to couple with respective end portions of a flexible tape or foil 26 or another type of resin support extending therebetween. A portion of the foil 26 can be supported from underneath by the support plate 14 that defines a support plate upper surface 28. Suitable mechanical supports (frames, brackets, etc.) may be provided for the rollers 22A, 24A and the support plate 14. The first roller 22A and/or the second roller 24A can be configured to control the speed and direction of the foil 26 such that the desired tension and speed is maintained in the foil 26 through a drive system. By way of example and not limitation, the drive system can be configured as individual motors associated with the first roller 22A and/or the second roller 24A. Moreover, various components, such as motors, actuators, feedback sensors, and/or controls can be provided for driving the rollers 22A, 24A in such a manner so as to move at least a portion of the foil 26 between the rollers 22A, 24A.

In various embodiments, the window 16 is transparent and can be operably supported by the support plate 14. Further, the window 16 and the support plate 14 can be integrally formed such that one or more windows 16 are integrated within the support plate 14. Likewise, the foil 26 is also transparent or includes portions that are transparent. As used herein, the terms "transparent" and "radiotransparent" refer to a material that allows at least a portion of radiant energy of a selected wavelength to pass through. For example, the radiant energy that passes through the window 16 and the foil 26 can be in the ultraviolet spectrum, the infrared spectrum, the visible spectrum, or any other practicable radiant energy. Non-limiting examples of transparent materials include polymers, glass, and crystalline minerals, such as sapphire or quartz.

The foil 26 extends between the feed module 22 and the take-up module 24 and defines a "build surface" 32, which is shown as being planar, but could alternatively be arcuate (depending on the shape of the support plate 14). In some instances, the build surface 32 may be defined by the foil 26 and be positioned to face the stage 18 with the window 16 on an opposing side of the foil 26 from the stage 18. For purposes of convenient description, the build surface 32 may be considered to be oriented parallel to an X-Y plane of the apparatus 10, and a direction perpendicular to the X-Y plane is denoted as a Z-axis direction (X, Y, and Z being three mutually perpendicular directions). As used herein, the X-axis refers to the machine direction along the length of the foil 26. As used herein, the Y-axis refers to the transverse direction across the width of the foil 26 and generally perpendicular to the machine direction. As used herein, the Z-axis refers to the stage direction that can be defined as the direction of movement of the stage 18 relative to the window 16.

The build surface 32 may be configured to be "non-stick," that is, resistant to adhesion of a cured resin R. The non-stick properties may be embodied by a combination of variables such as the chemistry of the foil 26, its surface finish, and/or applied coatings. For instance, a permanent or semi-permanent non-stick coating may be applied. One non-limiting example of a suitable coating is polytetrafluoroethylene ("PTFE"). In some examples, all or a portion of the build surface 32 may incorporate a controlled roughness or surface texture (e.g. protrusions, dimples, grooves, ridges, etc.) with nonstick properties. Additionally, or alternatively, the foil 26 may be made in whole or in part from an oxygen-permeable material.

For reference purposes, an area or volume immediately surrounding the location of the foil 26 and the window 16 or transparent portion defined by the support plate 14 may be defined as a "build zone," labeled 34.

In some instances, a material depositor 36 may be positioned along the foil 26 and can include a reservoir. The material depositor 36 may be any device or combination of devices that is operable to apply a layer of resin R on the foil 26. The material depositor 36 may optionally include a device or combination of devices to define a height of the resin R on the foil 26 and/or to level the resin R on the foil 26. Nonlimiting examples of suitable material deposition devices include chutes, hoppers, pumps, spray nozzles, spray bars, or printheads (e.g. inkjets). In some examples, a doctor blade may be used to control the thickness of resin R applied to the foil 26, as the foil 26 passes the material depositor 36.

The resin R includes any radiant-energy curable material, which is capable of adhering or binding together the filler (if used) in the cured state. As used herein, the term "radiant-energy curable" refers to any material which solidifies or partially solidifies in response to the application of radiant energy of a particular frequency and energy level. For example, the resin R may include a photopolymer resin containing photo-initiator compounds functioning to trigger a polymerization reaction, causing the resin R to change from a liquid (or powdered) state to a solid state. Alternatively, the resin R may include a material that contains a solvent that may be evaporated out by the application of radiant energy. The uncured resin R may be provided in solid (e.g. granular) or liquid form, including a paste or slurry.

Furthermore, the resin R can have a relatively high viscosity fluid that will not "slump" or run off during the build process. The composition of the resin R may be selected as desired to suit a particular application. Mixtures of different compositions may be used. The resin R may be selected to have the ability to out-gas or burn off during further processing, such as a sintering process.

The resin R may incorporate a filler. The filler may be pre-mixed with resin R, then loaded into the material depositor 36. The filler includes particles, which are conventionally defined as "a very small bit of matter." The filler may include any material that is chemically and physically compatible with the selected resin R. The particles may be regular or irregular in shape, may be uniform or non-uniform in size, and may have variable aspect ratios. For example, the particles may take the form of powder, of small spheres or granules, or may be shaped like small rods or fibers.

The composition of the filler, including its chemistry and microstructure, may be selected as desired to suit a particular application. For example, the filler may be metallic, ceramic, polymeric, and/or organic. Other examples of potential fillers include diamond, silicon, and graphite. Mixtures of different compositions may be used. In some examples, the filler composition may be selected for its electrical or electromagnetic properties, e.g. it may specifically be an electrical insulator, a dielectric material, an electrical conductor, and/or magnetic.

The filler may be "fusible," meaning it is capable of consolidation into a mass upon via application of sufficient energy. For example, fusibility is a characteristic of many available powders including but not limited to polymeric, ceramic, glass, and metallic. The proportion of filler to resin R may be selected to suit a particular application. Generally, any amount of filler may be used so long as the combined material is capable of flowing and being leveled, and there is sufficient resin R to hold together the particles of the filler in the cured state.

The stage 18 is a structure defining a planar surface 38, which is capable of being oriented parallel to the build surface 32 or the X-Y plane. Various devices may be provided for moving the stage 18 relative to the window 16 parallel to the Z-axis direction. For example, as illustrated in FIG. 1, the movement may be provided through a vertical actuator 40 connected between the stage 18 and a static support 42, with the understanding that devices such as ballscrew electric actuators, linear electric actuators, pneumatic cylinders, hydraulic cylinders, delta drives, or any other practicable device may additionally or alternatively be used for this purpose. In addition to, or as an alternative to, making the stage 18 movable, the foil 26 could be movable parallel to the Z-axis direction.

The radiant energy device 20 may be configured as any device or combination of devices operable to generate and project radiant energy on the resin R in a suitable pattern and with a suitable energy level and other operating characteristics to cure the resin R during the build process. For example, as shown in FIG. 1, the radiant energy device 20 may include a projector 44, which may generally refer to any device operable to generate a radiant energy patterned image of suitable energy level and other operating characteristics to cure the resin R. As used herein, the term "patterned image" refers to a projection of radiant energy comprising an array of one or more individual pixels. Non-limiting examples of patterned imaged devices include a DLP projector or another digital micromirror device, a two-dimensional array of LEDs, a two-dimensional array of lasers, and/or optically addressed light valves. In the illustrated example, the projector 44 includes a radiant energy source 46 such as a UV lamp, an image forming apparatus 48 operable to receive a source beam 50 from the radiant energy source 46 and generate a patterned image 52 to be projected onto the surface of the resin R, and optionally focusing optics 54, such as one or more lenses.

The image forming apparatus 48 may include one or more mirrors, prisms, and/or lenses and is provided with suitable actuators, and arranged so that the source beam 50 from the radiant energy source 46 can be transformed into a pixelated image in an X-Y plane coincident with the surface of the resin R. In the illustrated example, the image forming apparatus 48 may be a digital micro-mirror device.

The projector 44 may incorporate additional components, such as actuators, mirrors, etc. configured to selectively move the image forming apparatus 48 or other part of the projector 44 with the effect of rastering or shifting the location of the patterned image on the build surface 32. Stated another way, the patterned image may be moved away from a nominal or starting location.

In addition to other types of radiant energy devices 20, the radiant energy device 20 may include a "scanned beam apparatus" used herein to refer generally to any device operable to generate a radiant energy beam of suitable energy level and other operating characteristics to cure the resin R and to scan the beam over the surface of the resin R in a desired pattern. For example, the scanned beam apparatus can include a radiant energy source 46 and a beam steering apparatus. The radiant energy source 46 may include any device operable to generate a beam of suitable power and other operating characteristics to cure the resin R. Non-limiting examples of suitable radiant energy sources 46 include lasers or electron beam guns.

The apparatus 10 may be operably coupled with a computing system 58. The computing system 58 in FIG. 1 is a generalized representation of the hardware and software that may be implemented to control the operation of the apparatus 10, including some or all of the stage 18, the radiant energy device 20, actuators, and the various parts of the apparatus 10 described herein. The computing system 58 may be embodied, for example, by software running on one or more processors embodied in one or more devices such as a programmable logic controller ("PLC") or a microcomputer. Such processors may be coupled to process sensors and operating components, for example, through wired or wireless connections. The same processor or processors may be used to retrieve and analyze sensor data, for statistical analysis, and for feedback control. Numerous aspects of the apparatus 10 may be subject to closed-loop control.

Optionally, the components of the apparatus 10 may be surrounded by a housing 60, which may be used to provide a shielding or inert gas (e.g., a "process gas") atmosphere using gas ports 62. Optionally, pressure within the housing could be maintained at a desired level greater than or less than atmospheric. Optionally, the housing could be temperature and/or humidity controlled. Optionally, ventilation of the housing could be controlled based on factors such as a time interval, temperature, humidity, and/or chemical species concentration. In some embodiments, the housing 60 can be maintained at a pressure that is different than an atmospheric pressure.

Figure 2:
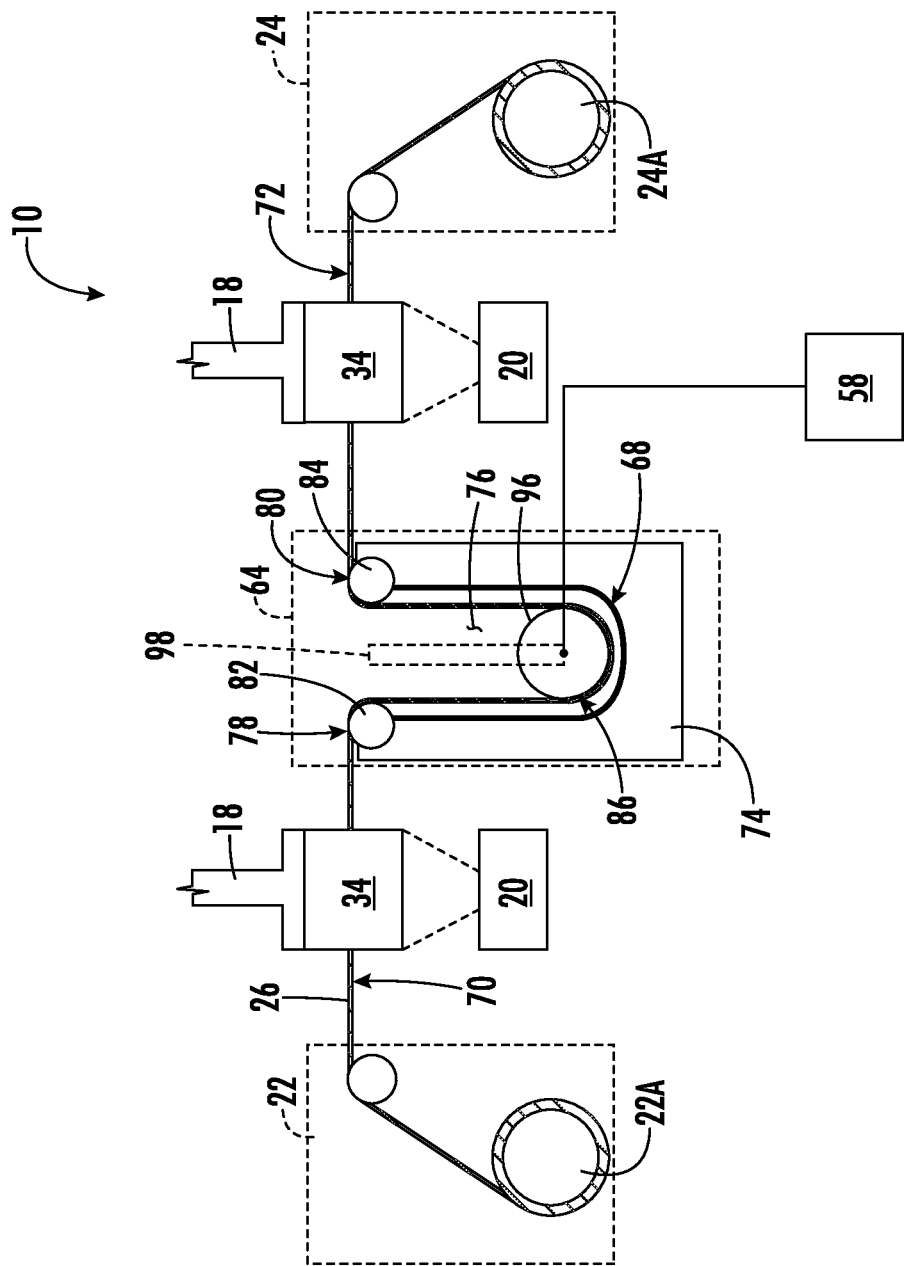
FIG. 2 is a schematic side view of the additive manufacturing apparatus having an accumulator positioned between first and second stages in accordance with various aspects of the present disclosure.
Figure 3:
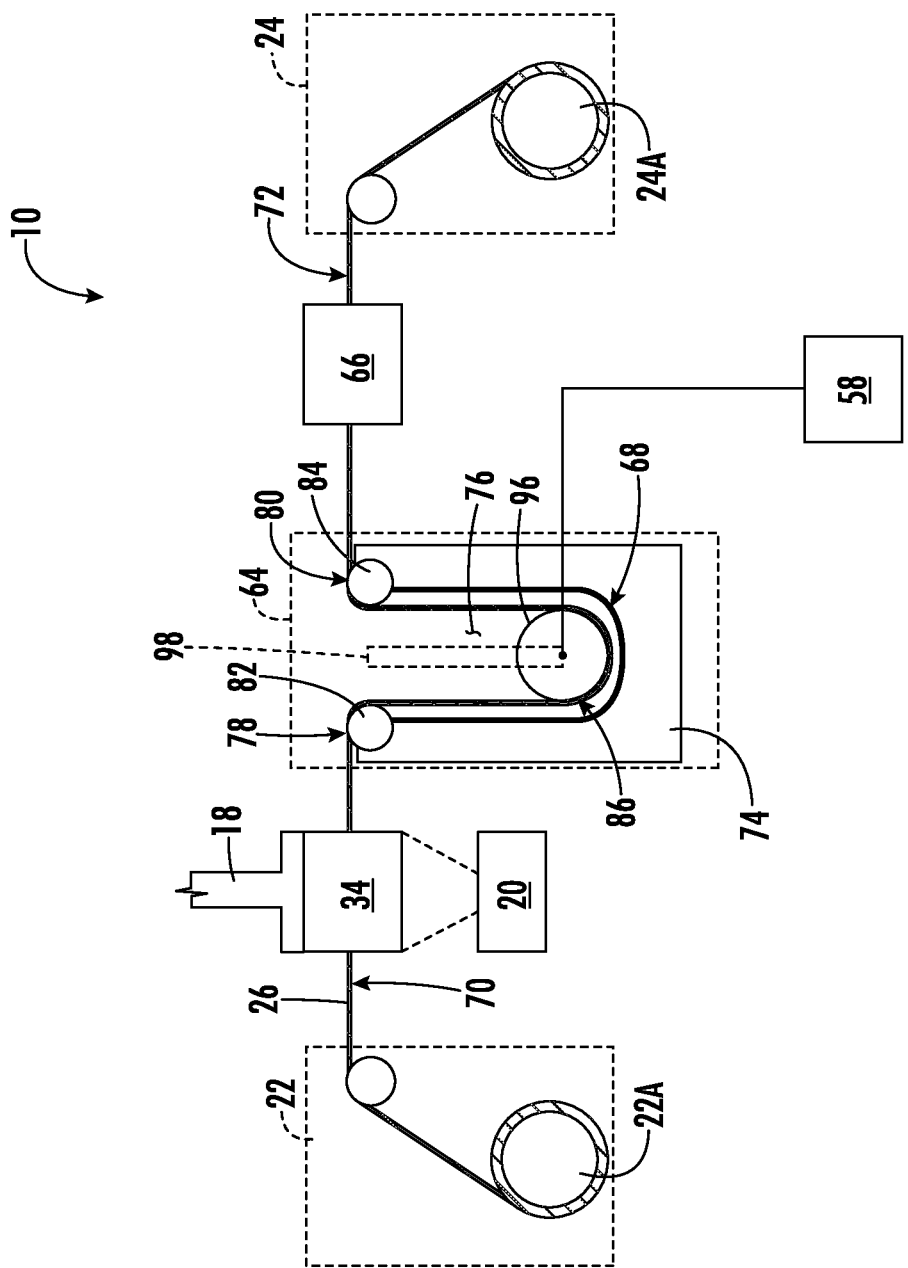
FIG. 3 is a schematic side view of the additive manufacturing apparatus having the accumulator positioned between a stage and a resin reclamation system in accordance with various aspects of the present disclosure.

Referring to FIGS. 2 and 3, a schematic drawings of an accumulator that may be positioned within the manufacturing apparatus 10 are illustrated. In general, the accumulator may be positioned between two components along the foil path of the apparatus. For example, as illustrated in FIG. 2, the accumulator 64 may be positioned between a pair of build zones 34. Additionally, or alternatively, as illustrated in FIG. 3, the accumulator 64 may be positioned between a build zone 34 and a resin reclamation system 66. In some embodiments, the reclamation system 66 may be configured to remove at least a portion of uncured resin R that remains on the foil 26 after the foil 26 is removed from a build zone 34. For example, the reclamation system 66 may include a wiper assembly, a blade assembly, and/or any other removal assembly and a reservoir for collecting the resin R that is removed from the foil 26.

With further reference to FIGS. 2 and 3, in some embodiments, the accumulator 64 may be configured to retain an intermediate portion 68 of the foil 26. For instance, a first portion 70 of the foil 26 upstream of the accumulator 64 and a second portion 72 of the foil 26 downstream of the accumulator 64. By retaining the intermediate portion 68 of the foil 26, the first and second portions 70, 72 of the foil 26 may be moved independently of one another. For example, the first portion 70 of the foil 26 upstream of the accumulator 64 can move at a first speed while the second portion 72 of the foil 26 downstream of the accumulator 64 can move at a second speed. Additionally, or alternatively, the first portion 70 of the foil 26 upstream of the accumulator 64 can move intermittently while the second portion 72 of the foil 26 downstream of the accumulator 64 can move continuously. Additionally, or alternatively, the first portion 70 of the foil 26 upstream of the accumulator 64 can move continuously while the second portion 72 of the foil 26 downstream of the accumulator 64 can move intermittently. Further, the first portion 70 and/or the second portion 72 of the foil 26 may move in any other manner independent of one another without departing from the teachings provided herein.

As illustrated in FIGS. 2 and 3, the accumulator 64 may include an accumulator housing 74 defining a cavity 76 therein. The cavity 76 is configured to house the intermediate portion 68 of the foil 26. However, it will be appreciated that in other embodiments, the accumulator may be free of a housing and/or a cavity. Further, in some embodiments, the accumulator may be in line with the foil path.

The intermediate portion 68 of the foil 26 may be of variable length during operation of the apparatus 10. For example, in some instances, a first length of foil 26 may be within the cavity 76 during a first period of time during operation of the apparatus 10 and a second length of foil 26 may be within the cavity 76 during a second period of time after the first period of time. The second length of foil 26 may be equal to, less than, or greater than the first length based on the operations of the apparatus 10.

With further reference to FIGS. 2 and 3, one or more guides 78, 80 may be operably coupled with the accumulator housing 74 to assist or direct the foil 26 from a position upstream of the cavity 76 into the cavity 76 and/or downstream of the cavity 76 out of the cavity 76. For instance, in the embodiments illustrated in FIGS. 2 and 3, the one or more guides 78, 80 may be configured as first and second rollers 82, 84 positioned on opposing sides of the cavity 76.

In some instances, the accumulator 64 may include a material retention assembly 86 to retain the foil 26. For example, the material retention assembly 86 may include one or more retaining rollers 96 within the cavity 76 defined by the accumulator 64. The one or more retaining rollers 96 may be configured to maintain the foil 26 in a within the cavity 76. For instance, the retaining roller 96 may be configured to pull the foil 26 towards a bottom portion 100 of the cavity 76 by providing a force on the first side of the foil 26. The retaining roller 96 may be configured to move at least partially within the cavity 76 and/or may be stationary within a predefined location within the cavity 76. In some instances, the one or more retaining rollers 96 may be configured as a dimpled roller or the like to provide a tension across the width of the foil while minimizing contact with the foil 26 and/or any resin R disposed on the foil 26. Additionally or alternatively, the one or more retaining rollers 96 may be configured to contact an outer perimeter of the foil 26 that is outside of the resin R such that the one or more retaining rollers 96 remains free of resin R as the foil 26 moves from the feed module 22 towards the take-up module 24.

As illustrated, an actuator 98 may be operably coupled with the one or more retaining rollers 96 and configured to alter a position of the one or more retaining rollers 96. The actuator may also be communicatively coupled with the computing system 58.

Figure 4:
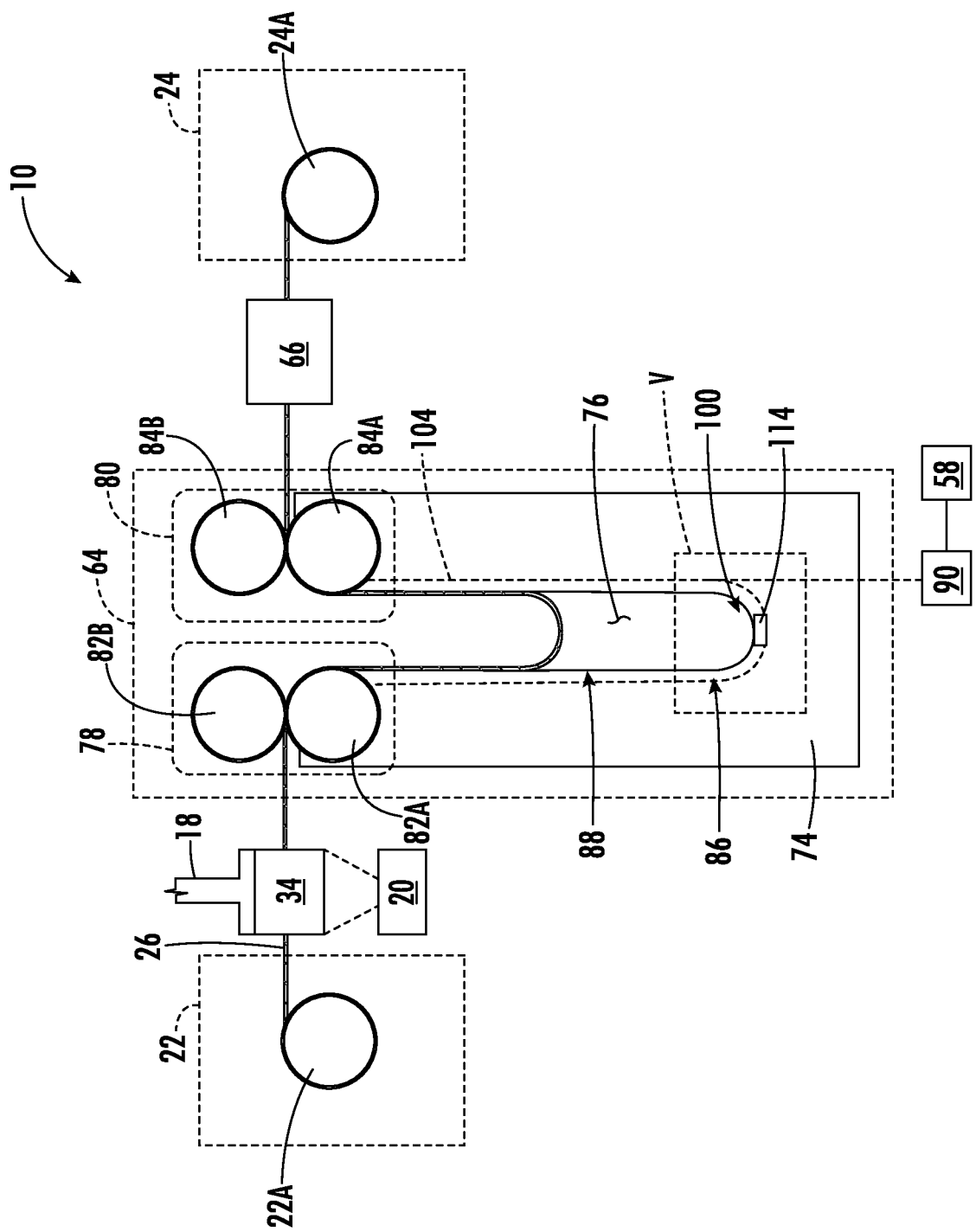
FIG. 4 is a schematic side view of the additive manufacturing apparatus having the accumulator having a pair of guides in accordance with various aspects of the present disclosure.

Additionally, or alternatively, as illustrated FIG. 4, in some instances, the material retention assembly 86 can include one or more pneumatic actuation zones 88 with each pneumatic actuation zone 88 configured to selectively interact with the foil 26 by producing a force on a surface of the foil 26 opposite the resin R.

The one or more pneumatic actuation zones 88 may apply a negative pressure on a first surface of the foil 26 that is opposite to the resin, or a second side of the foil 26, to produce a suction or vacuum on the foil 26. The negative pressure may retain the foil 26 in a desired position within the cavity 76. As used herein, a "negative" pressure is any pressure that is less than an ambient pressure proximate to one or more pneumatic actuation zones 88 such that fluid may be drawn into the one or more pneumatic actuation zones 88. Conversely, a "positive" pressure is any pressure that is greater than an ambient pressure proximate to one or more pneumatic actuation zones 88 such that fluid may be exhausted from the one or more pneumatic actuation zones 88. Further, a "neutral" pressure is any pressure that is generally equal to an ambient pressure proximate to one or more pneumatic actuation zones 88.

In some examples, the pneumatic actuation zones 88 may be fluidly coupled with a pneumatic assembly 90 through various hoses and one or more ports. The pneumatic assembly 90 may include any device capable of providing a vacuum/suction and/or pushing a fluid, such as air or a process gas (e.g., nitrogen or argon), through the one or more pneumatic actuation zones 88. For instance, the pneumatic assembly 90 may include a pressurized fluid source that includes a compressor and/or a blower. The pneumatic assembly 90 may additionally or alternatively include any assembly capable of altering a pressure, such as a venturi vacuum pump. In some embodiments, one or more valves and/or switches may be coupled with the pneumatic assembly 90 and the one or more pneumatic actuation zones 88. The one or more valves and/or switches are configured to regulate a pressure to each of the one or more pneumatic actuation zones 88.

Figure 5:
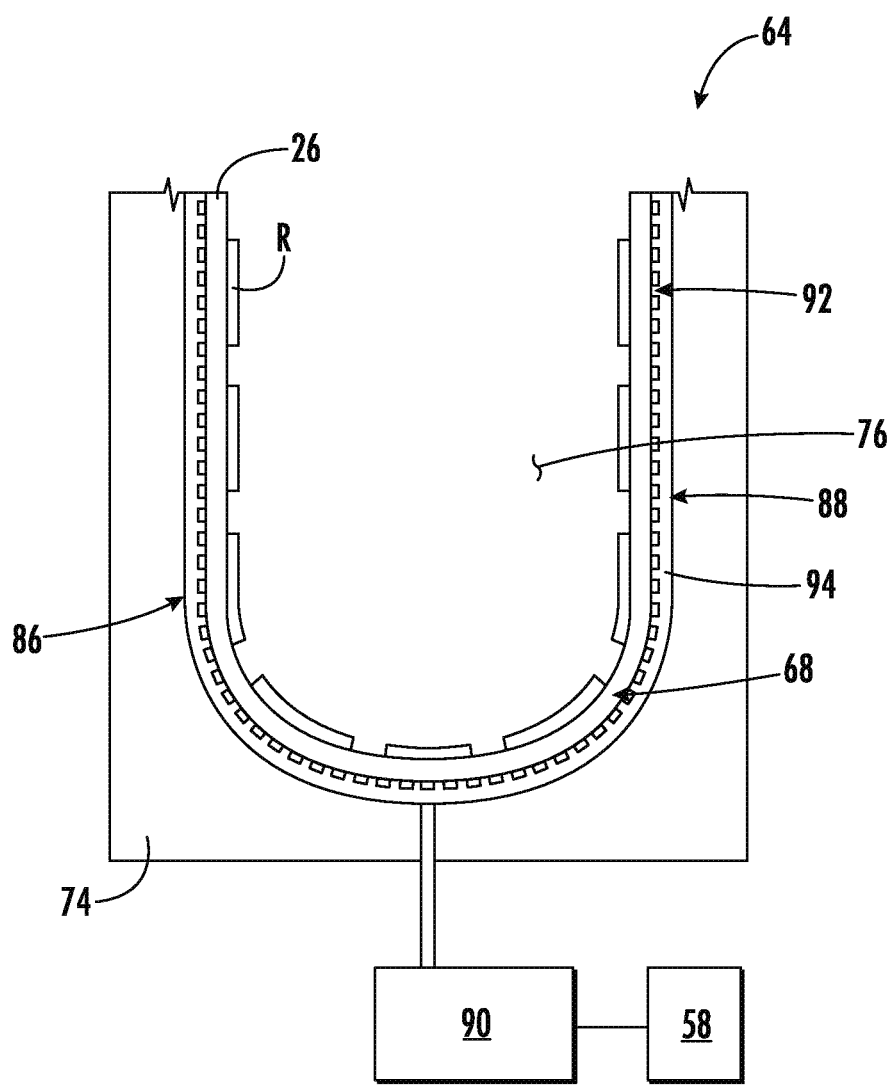
FIG. 5 is an enhanced view of area V of FIG. 4 in accordance with various aspects of the present disclosure.

Referring to FIG. 5, an enhanced view of area V of FIG. 4 illustrates an exemplary pneumatic actuation zone 88 that includes one or more apertures 92 of any size and shape for interacting with the foil 26. For instance, the apertures 92 may be any number and combination of holes, slits, or other geometric shapes defined by any component of the additive manufacturing apparatus 10, such as an inner surface of the housing. Additionally, or alternatively, the apertures 92 may be defined by a portion of the housing being formed from a porous material, or through any other assembly in which a fluid may be moved from a first side of the inner surface of the housing to a second side of the inner surface of the housing to interact with the foil 26.

In some examples, the pneumatic actuation zone 88 may be defined by a plenum 94. The plenum 94 may be of any size and may be similar or varied from the shape of any remaining plenums 94. In some instances, a gasket may be positioned about a rim of the plenum 94. As illustrated in FIG. 5, in various embodiments, the one or more pneumatic actuation zones 88 of the material retention assembly 86 may be configured to interact with a first side of the foil 26 while the resin R is provided on a second, opposing side of the foil 26.

Figure 6:
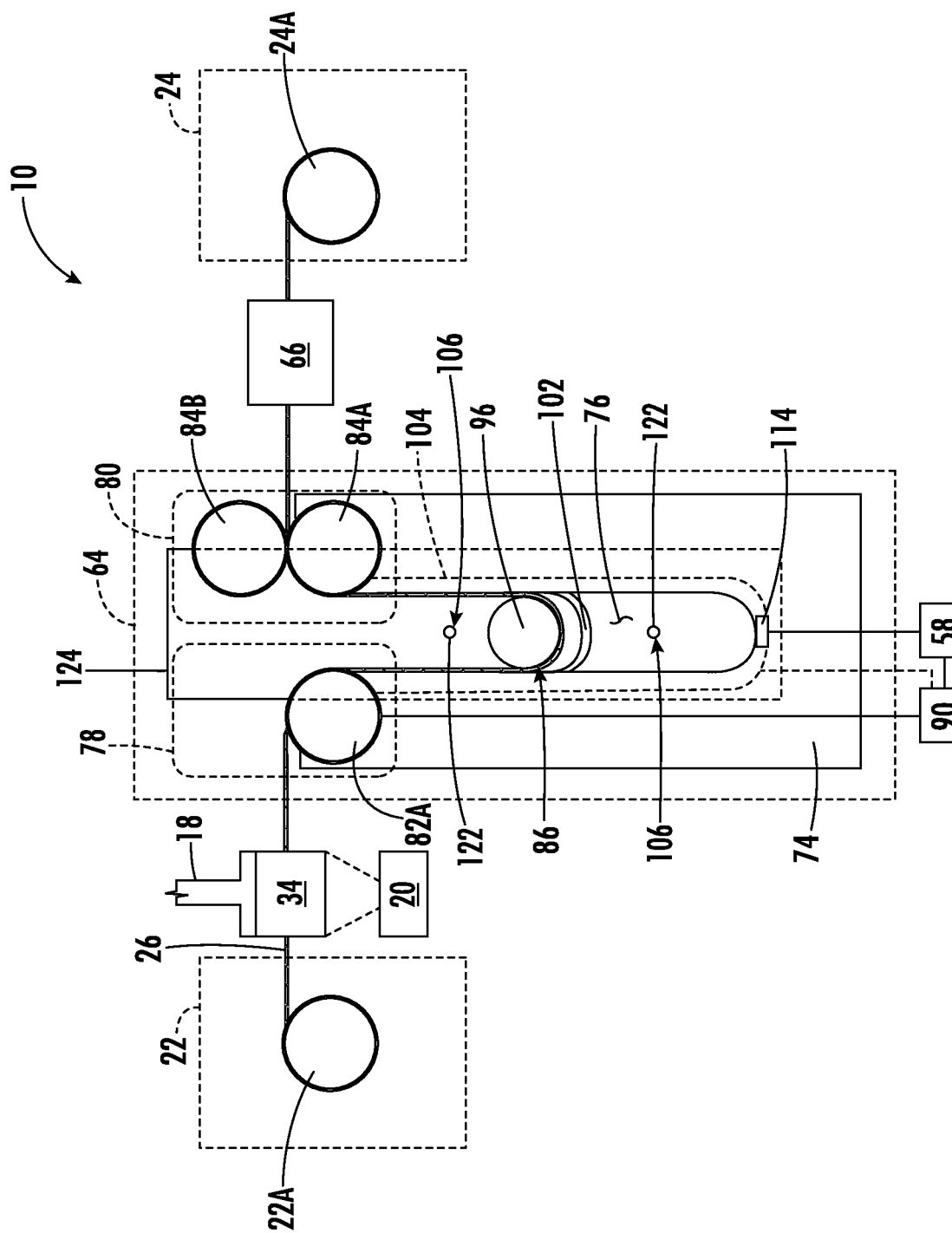
FIG. 6 is a schematic side view of the additive manufacturing apparatus having the accumulator having a first guide configured as a guide pneumatic device and a second guide configured as a pair of rollers in accordance with various aspects of the present disclosure.
Figure 7:
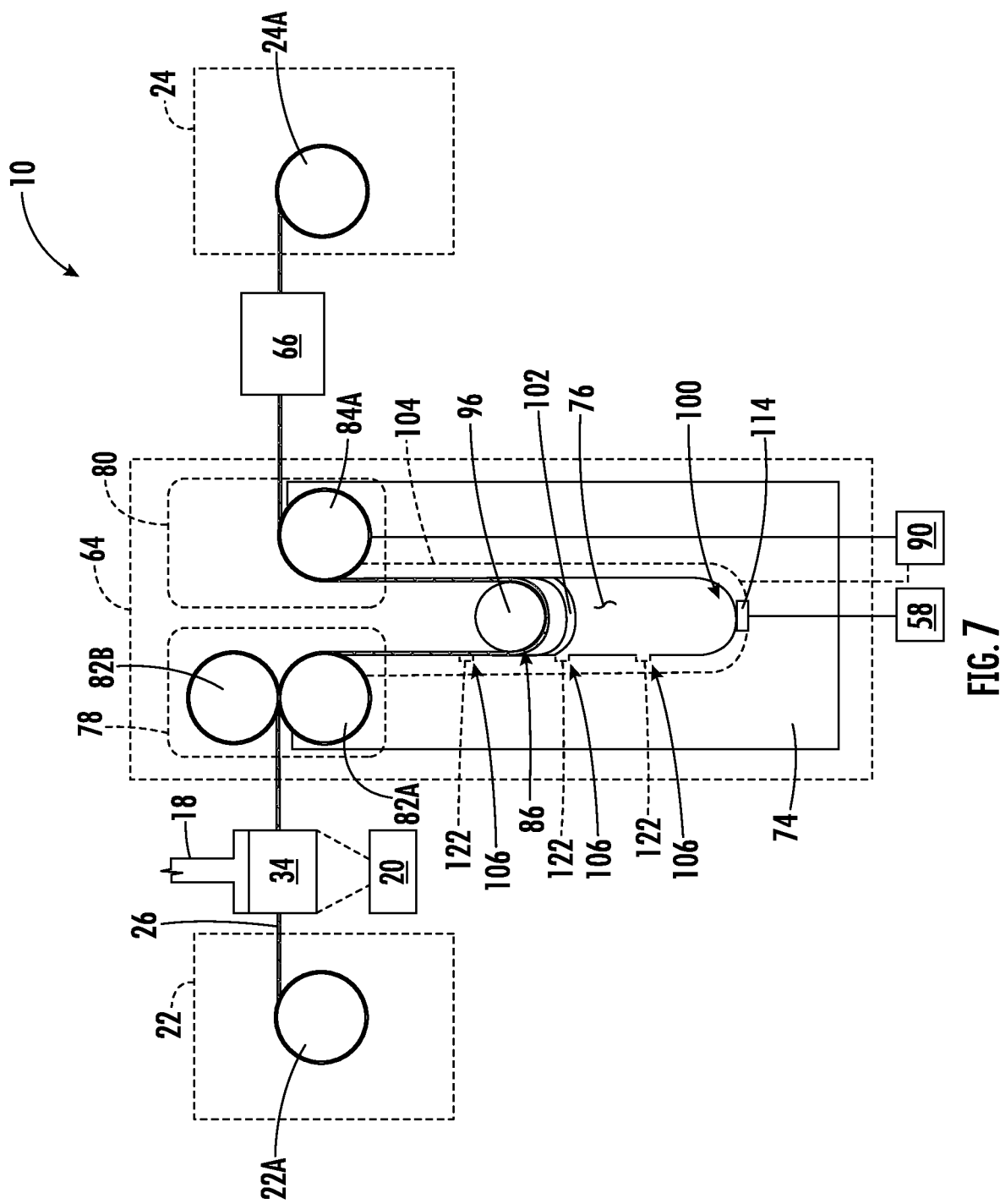
FIG. 7 is a schematic side view of the additive manufacturing apparatus having the accumulator having the first guide configured as a pair of rollers and a second guide configured as a guide pneumatic device in accordance with various aspects of the present disclosure.

Additionally, or alternatively, as illustrated in FIGS. 6 and 7, the accumulator 64 may include a support 102 that is configured to interact with the first side of the foil 26. In some instances, the support 102 may include a pneumatic zone such that the first side of the foil 26 may be drawn towards the support 102 when a negative pressure is experienced through the support 102.

In various embodiments, the retaining roller 96 and/or the support 102 of FIGS. 6 and 7 may be operably coupled with a track assembly 104 that guides movement of the retaining roller 96 and/or the support 102 along the cavity 76. The track assembly 104 may be of any configuration such as a guide and/or a swing arm and may utilize electronic control, mechanical control (spring(s)), pneumatic control, or any other control for directing the retaining roller 96 and/or the support 102 within the cavity 76. Moreover, it will be appreciated that the track assembly 104 may be of any geometric shape and may have generally linear and/or curved portions.

With further reference to FIGS. 4-7, in several embodiments, a detection system 106 may be positioned within the accumulator 64. The detection system 106 may be capable of providing data related to one or more conditions of the accumulator 64 and/or the foil 26 within the accumulator 64. Based on the received data, the computing system 58 may determine a length of the foil 26 within the accumulator 64, a distance from a lowermost portion of the foil 26 above a bottom portion 100 of the cavity 76, an amount of foil 26 within the cavity 76 of the accumulator 64, a change in the amount of foil 26 within the accumulator 64, a speed at which the foil 26 enters and/or exits the cavity 76, and/or any other information. Based on the conditions of the accumulator 64 and/or the foil 26 within the accumulator 64, various portions of the foil 26 may be moved at different speeds relative to one another and/or a first portion 70 of the foil 26 may move intermittently (e.g., stopped for at least a portion of time during a predefined time period) while a second portion 72 of the foil 26 may be configured to move continuously during the predefined time period.

In some embodiments, the detection system 106 may include a sensor 114, which may be positioned within the accumulator 64 and/or otherwise configured to detect data related to one or more conditions of the accumulator 64 and/or the foil 26 within the accumulator 64. The sensor 114 may be embodied as one or more imagers or any other vision-based device. The sensor 114 may additionally and/or alternatively be configured as any other practicable proximity sensor, such as, but not limited to, an ultrasonic sensor, a radar sensor, a LIDAR sensor, or the like.

Additionally, or alternatively, in various embodiments, the detection system 106 may include one or more bypass holes 122 defined by the accumulator housing 74 along the cavity 76 of the accumulator 64. In various embodiments, such as the embodiment illustrated in FIG. 6, the bypass holes 122 may be defined within a cavity plate 124 that extends rearwardly and/or forwardly of the cavity 76. The accumulator 64 may include both forwardly and rearwardly cavity plates 124 that extend along opposing open ends of the cavity 76. Additionally or alternatively, as illustrated in FIG. 7, in some embodiments, the one or more bypass holes 122 may be defined by the housing 74 and extend along the housing 74 within the cavity 76. The bypass holes 122 may form a passive valve system in which the position of the foil 26 within the cavity 76 may be determined by detecting which holes 122 have a vacuum pulled thereon and which holes 122 do not have a flow. For example, when the foil 26 does not extend beyond a respective bypass hole 122, a negative pressure will be provided on the bypass hole 122. Conversely, when the foil 26 extends beyond a respective bypass hole 122, the negative pressure detected by the bypass hole 122 may be reduce and/or no longer present. As such, based on which bypass holes 122 have a negative pressure thereon, the location of the foil 26 within the cavity 76 may be generally provided to the computing system 58 as data.

Referring to FIGS. 4-9, the one or more guides 78, 80 of the accumulator 64 includes a first guide 78 on a first side of the cavity 76 and/or a second guide 80 on a second side of the cavity 76 to assist or direct the foil 26 from a position upstream of the cavity 76 into the cavity 76 and/or downstream of the cavity 76 out of the cavity 76. Each of the first and second guides 78, 80 may be configured to move the foil 26 in a predetermined direction and/or retain the foil 26 in a predetermined position. The one or more guides 78, 80 can be configured to control the speed and direction of the foil 26 into and/or out of the accumulator 64. By way of example and not limitation, the one or more guides 78, 80 can include motors, actuators, feedback sensors, and/or controls for driving the one or more guides 78, 80 in such a manner so as to maintain the foil 26 tensioned between the feedback module and the take-up module 24.

In some embodiments, the first guide 78 may be configured to drive movement of the foil 26 from the feed module 22 to the accumulator 64 and the feed module 22 may be configured to control the tension of the foil 26 between the feed module 22 and the first guide 78. Further, the take-up module 24 may be configured to drive a movement of the foil 26 from the accumulator 64 to the take-up module 24 and the second guide 80 may be configured to control the tension of the foil 26 between the take-up module 24 and the second guide 80.

In various embodiments, such as the embodiment illustrated in FIG. 4, the first and second guides 78, 80 may each be configured as a pair of rollers 82A, 82B, 84A, 84B positioned on opposing first and second sides of the foil 26. Each respective pair of rollers 82A, 82B, 84A, 84B may contain a first roller 82A, 84A positioned on a first side of the foil 26 and a second roller 82B, 84B positioned on a second, opposing side of the foil 26. Each of the first and second rollers 82A, 82B, 84A, 84B contacts the foil 26 such that the foil 26 may be pinched or otherwise retained between each set of the first and second rollers 82A, 82B, 84A, 84B. In some instances, the first rollers 82A, 84A may be configured as a dimpled roller or the like to provide a tension across the width of the foil while minimizing contact with the foil 26 and/or any resin R disposed on the foil 26. Additionally, or alternatively, the first rollers 82A, 84A may be configured to contact an outer perimeter of the foil 26 that is outside of the resin R such that the roller 82A, 84A remains free of resin R as the foil 26 moves from the feed module 22 towards the take-up module 24.

Additionally, or alternatively, as illustrated in FIGS. 6 and 7, the first and/or the second guide 80 may include a guide pneumatic device 108 that is configured to draw the foil 26 towards the guide pneumatic device 108 when a negative pressure is provided through the guide pneumatic device 108. In instances in which the first guide 78 and/or the second guide 80 include the guide pneumatic device 108, the respective first guide 78 and/or the second guide 80 may include a single roller positioned below the bottom side of the foil 26.

Figure 8:
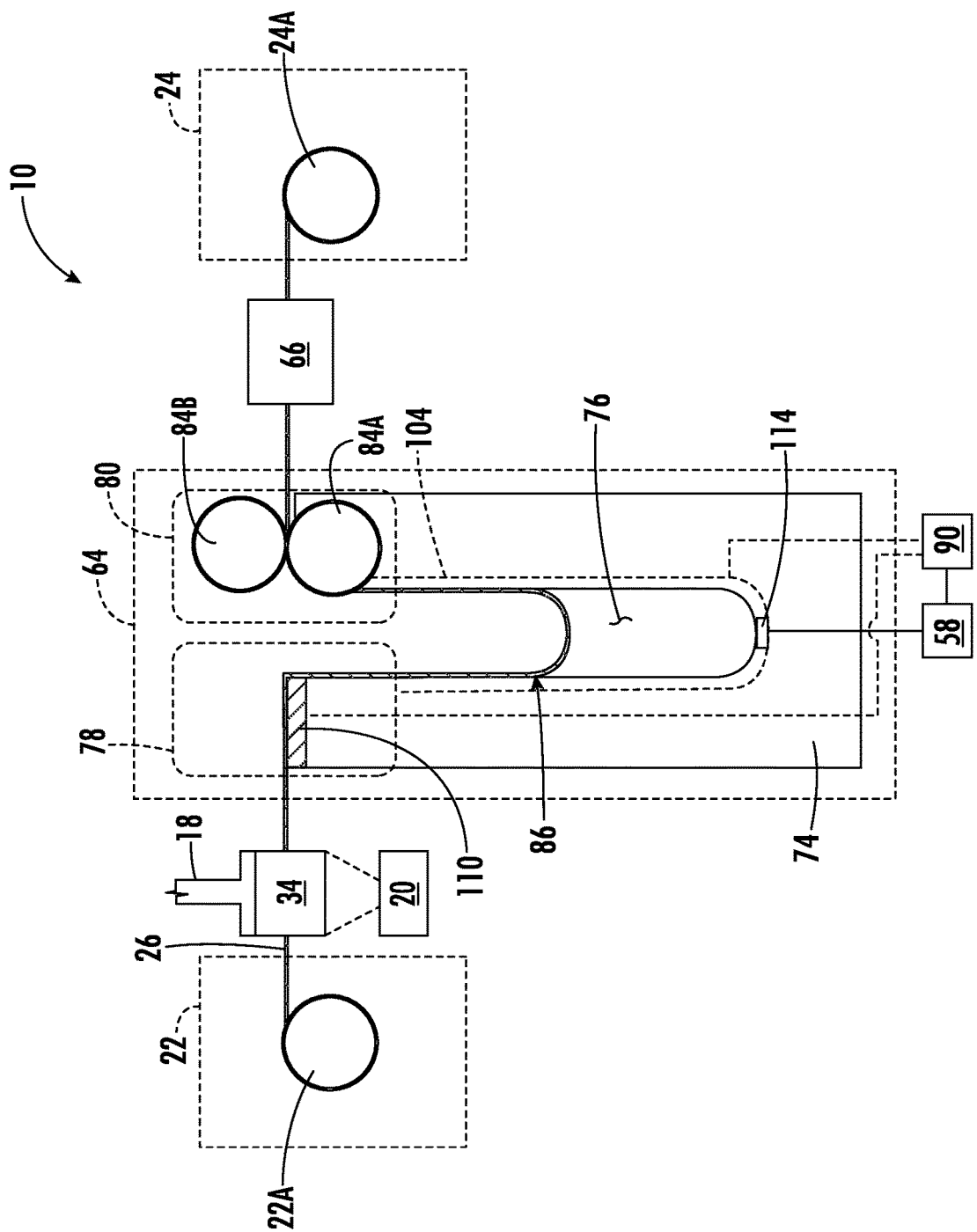
FIG. 8 is a schematic side view of the additive manufacturing apparatus having the accumulator having a first guide configured as a pneumatic plate and a second guide configured as a pair of rollers in accordance with various aspects of the present disclosure.
Figure 9:
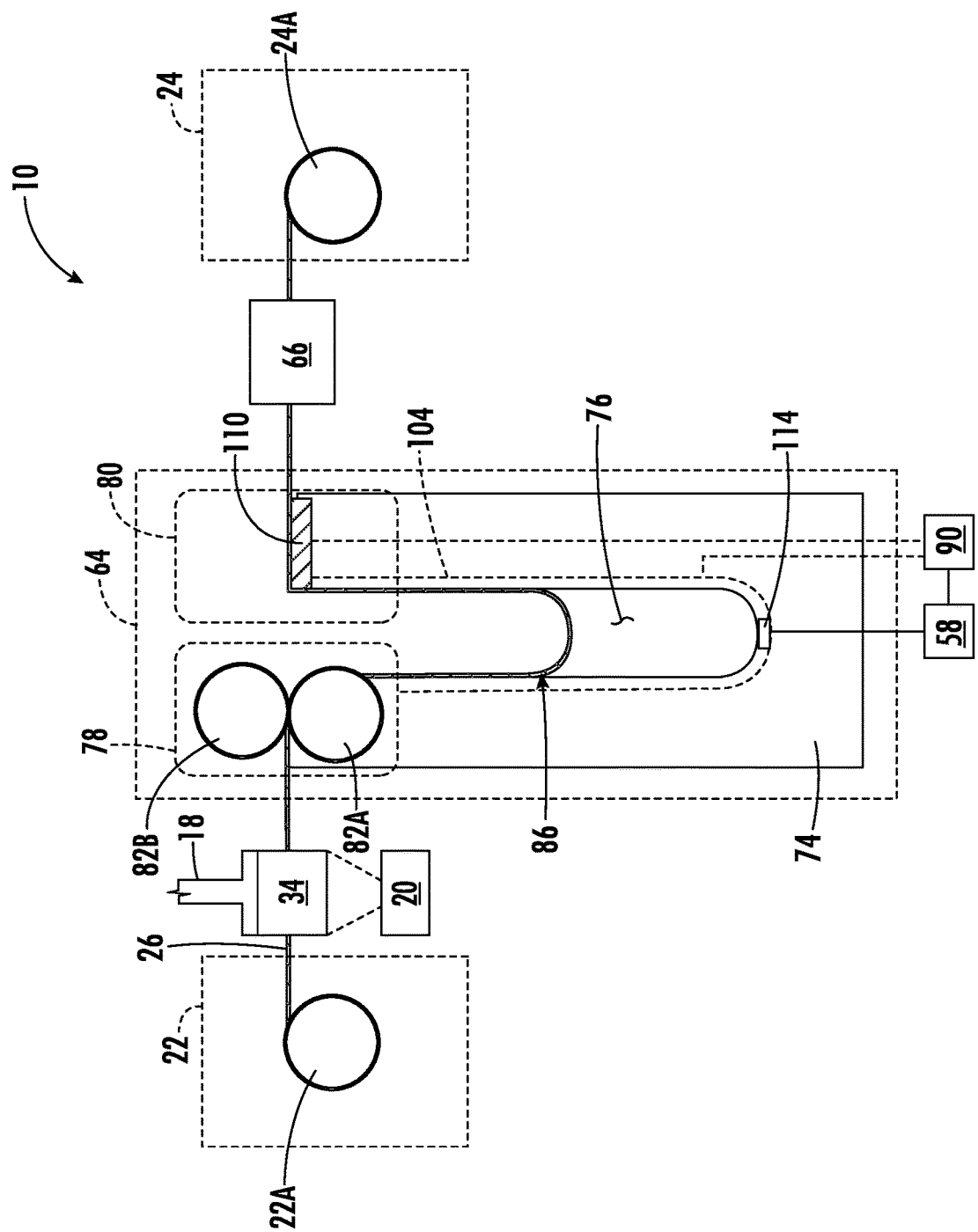
FIG. 9 is a schematic side view of the additive manufacturing apparatus having the accumulator having the first guide configured as a pair of rollers and a second guide configured as a pneumatic plate in accordance with various aspects of the present disclosure.

Referring to FIGS. 8 and 9, in several embodiments, the first guide 78 and/or the second guide 80 may be configured as a pneumatic plate 110. The suction plate may be integrated into the accumulator housing 74, the support plate 14, and/or any other component of the apparatus 10. Like the guide pneumatic device 108, the bottom side of the foil 26 may be drawn towards the pneumatic plate 110 when a negative pressure is provided through the pneumatic plate 110. Additionally, or alternatively, a positive pressure may be provided through the pneumatic plate 110 to blow the bottom side of the foil 26 away from the accumulator housing 74 or any other component of the apparatus 10.

Figure 10:
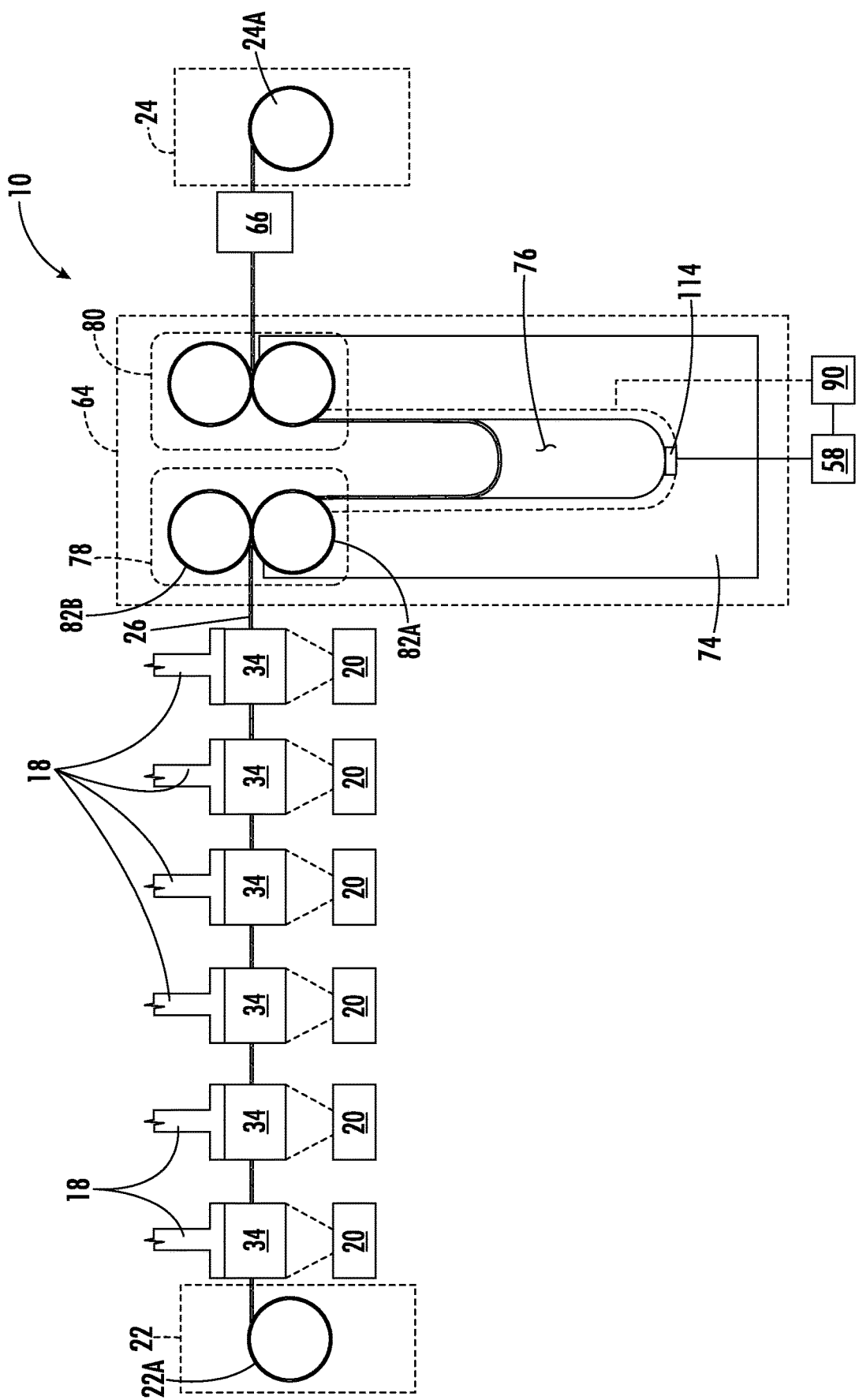
FIG. 10 is a schematic side view of the additive manufacturing apparatus having the accumulator positioned between a plurality of stages and a resin reclamation system in accordance with various aspects of the present disclosure.

Referring now to FIG. 10, a schematic drawing is provided illustrating a plurality of stages 18 in parallel positioned between the material depositor 36 and the accumulator 64 in accordance with an exemplary embodiment of the present disclosure. Each of the plurality of stages 18 may define an independent build zone 34. As provided herein, the accumulator 64 may include one or more guides 78, 80 that includes a first guide 78 on a first side of the cavity 76 and a second guide 80 on an opposing, second side of the cavity 76. Furthermore, the first guide 78 may drive the foil 26 from the feed module 22 through the plurality of build zones 34 and the feed module 22 may maintain a tension of the foil 26 between the feed module 22 and the first guide 78. In addition, the first guide 78 may also push the foil 26 therethrough and into the cavity 76 of the accumulator 64. The take-up module 24 may be used to drive the foil 26 downstream of the accumulator 64 and/or pull foil 26 from the accumulator 64 while the second guide 80 controls a tension of the foil 26 downstream of the second guide 80.

Figure 11:
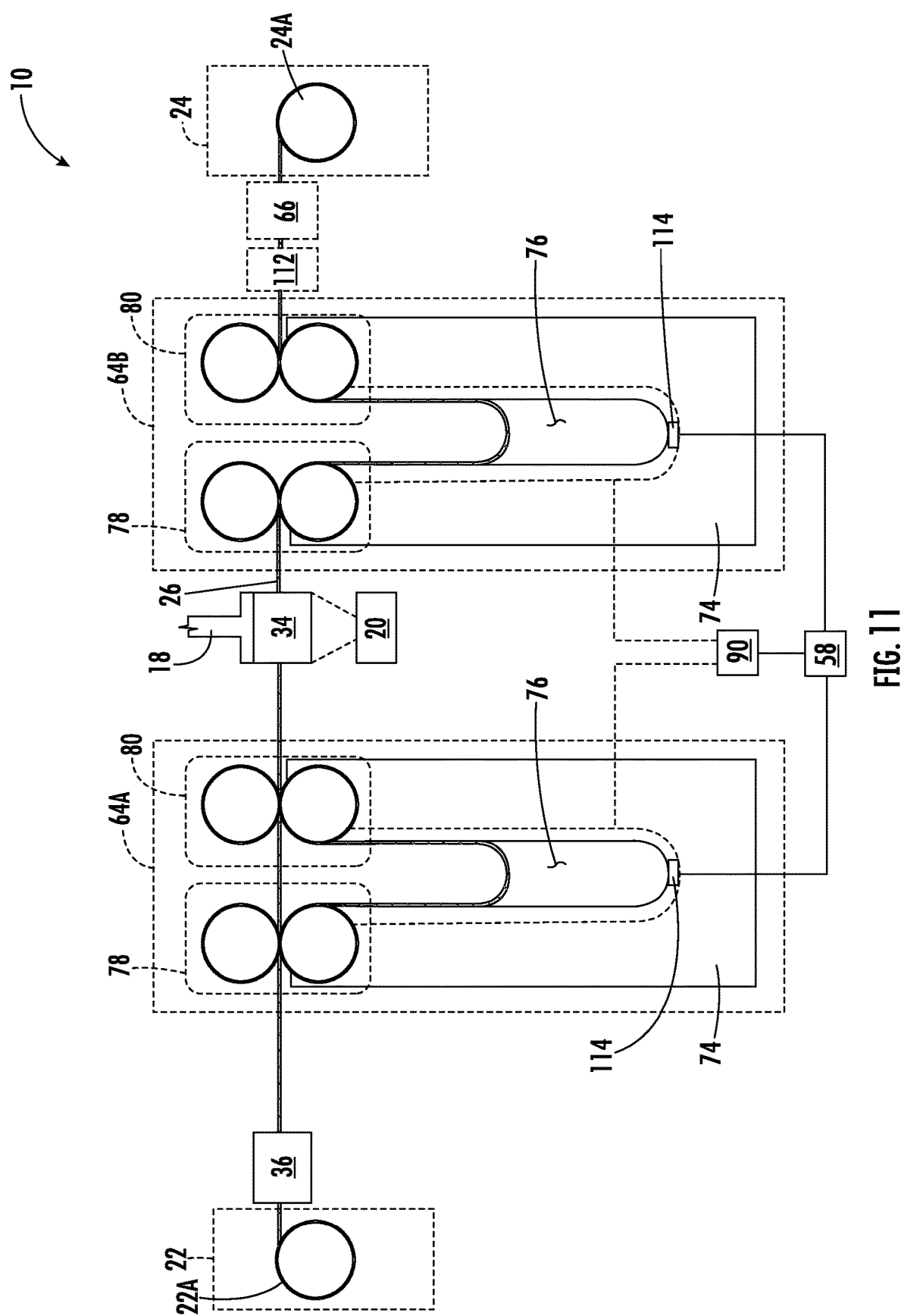
FIG. 11 is a schematic side view of the additive manufacturing apparatus having a first accumulator positioned upstream of a stage and a second accumulator positioned downstream of the stage in accordance with various aspects of the present disclosure.
Figure 12:
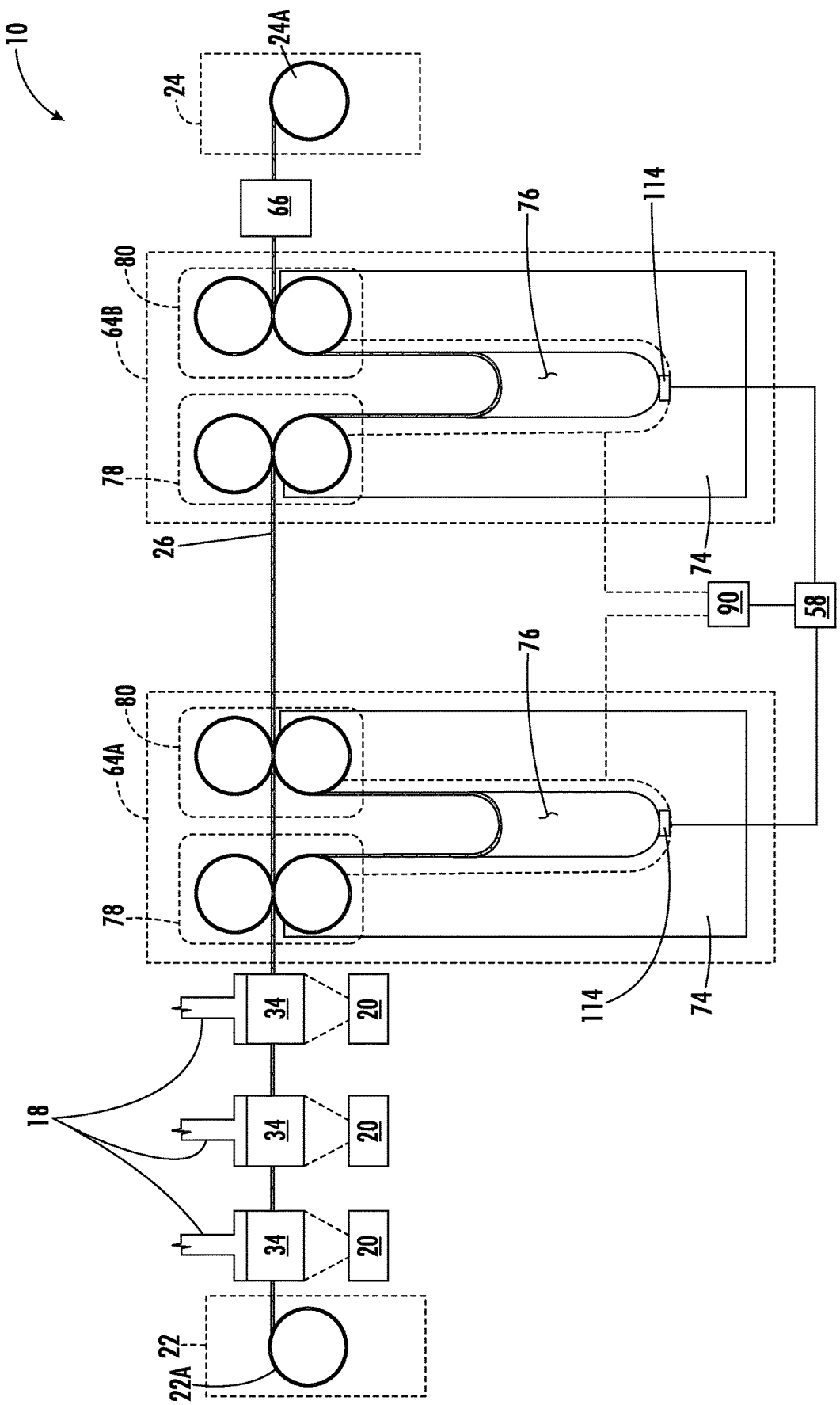
FIG. 12 is a schematic side view of the additive manufacturing apparatus having the first accumulator positioned downstream of the second accumulator with the stage upstream of both of the first and second accumulators in accordance with various aspects of the present disclosure.

Referring to FIGS. 11 and 12, schematic drawings are provided illustrating various exemplary embodiments that include multiple accumulators 64. The multiple accumulators 64 may be positioned upstream and downstream of a build zone 34, as exemplarily illustrated in FIG. 11. Additionally, or alternatively, as illustrated in FIG. 12, the accumulators 64 may be respectively positioned such that each of the build zones 34 and/or other assemblies are upstream and/or downstream of both of the accumulators 64.

In some embodiments, such as the exemplary embodiment illustrated in FIG. 11, the material depositor 36 may be positioned between the feed module 22 and a first accumulator 64A. In some instances, a first portion 116 of the foil 26 may be defined between the feed module 22 and the first accumulator 64A. One or more build zones 34 may be positioned downstream of the first accumulator 64A and upstream of a second accumulator 64B. A second portion 118 of the foil 26 may be defined between the first and the second accumulators 64A, 64B. In addition, a take-up module 24 may be downstream of the second accumulator 64B and a third portion 120 of foil 26 may be defined between the second accumulator 64B and the take-up module 24. Further, in some instances, a resin reclamation system 66 and/or another unit 112 may be positioned between the second accumulator 64B and the take-up module 24 and/or at any position between the feed module and the take-up module. For example, the unit 112 may accomplish any process that interacts with the foil 26, such as quality a process (e.g., image analysis of the foil 26).

In various embodiments, the first portion 116 of the foil 26 may move between the feed module 22 and the first accumulator 64A at a first speed, while the second portion 118 of the foil 26 may move between the first and second accumulators 64A, 64B at a second speed, and the third portion 120 of the foil 26 may move between the second accumulator 64B and the take-up module 24 at a third speed. In some instances, at least one of the first speed, the second speed, and/or the third speed may be different from any of the remaining speeds. Accordingly, the resin R may be deposited on the foil 26 upstream of the first accumulator 64A while the first portion 116 of foil 26 moves at a first speed. Independently, the second portion 118 of the foil 26 may be operated through one or more build zones 34 at a second speed. Likewise, the third portion 120 of the foil 26 may have at least a portion of the resin R remaining thereon that is removed through the reclamation system 66 with the third portion 120 of the foil 26 moving at the third speed.

Additionally, or alternatively, the first portion 116, the second portion 118, and/or third portion 120 of the foil 26 may each independently move in a continuous manner and/or intermittently over various time periods. For example, the first portion 116 of the foil 26 may move in a generally continuously move while the second portion 118 and/or the third portion 120 of the foil 26 move intermittently. Likewise, the second portion 118 of the foil 26 may move continuously while the first portion 116 and/or the third portion 120 of the foil 26 move intermittently. Further, the third portion 120 of the foil 26 may move continuously while the first portion 116 and/or the second portion 118 of the foil 26 move intermittently.

It will be appreciated that in addition to the same or different speeds of the various portions of the foil 26 discussed herein, the foil 26 within any of the one or more accumulators 64A, 64B may move at a speed that is different or equal to any other to the other portions of the foil 26.

Moreover, it will be appreciated that the foil 26 in any one or more of the accumulators 64A, 64B may be stationary for various time periods. The intermittent movement of the foil 26 may be independent of any of the portions of the foil 26 that are external to the one or more accumulators 64A, 64B of the apparatus 10.

Referring to FIG. 12, a schematic drawing is provided of an exemplary embodiment in which a pair of accumulators 64A, 64B are each positioned downstream of a plurality of build zones 34 and upstream of a post-curing process, such as a resin reclamation process that may be accomplished through the reclamation system 66. As illustrated, one of the first accumulator 64A or the second accumulator 64B may be timed to the cycle while the second of the first accumulator 64A or the second accumulator 64B may function as a buffer in case the first accumulator 64A and/or another portion of the apparatus 10 has temporary disturbances. As such, in some embodiments, the foil 26 may pass above the cavity 76 of the second accumulator 64B and into the cavity 76 of the first accumulator 64A when the first accumulator 64A is functioning correctly. Additionally, or alternatively, in instances when the computing system determines that the foil 26 is close to the bottom portion 100 of the first accumulator 64A, the second accumulator 64B may accept the foil 26 into the cavity 76 thereof.

Now that the construction and configuration of the additive manufacturing apparatus having one or more accumulators have been described according to various examples of the present subject matter, a method 200 for operating an additive manufacturing apparatus is provided. The method 200 can be used to operate the additive manufacturing apparatus and the one or more accumulators, or any other suitable additive manufacturing apparatus having any type and configuration of positioning assembly. It should be appreciated that the example method 200 is discussed herein only to describe example aspects of the present subject matter and is not intended to be limiting.

Figure 13:
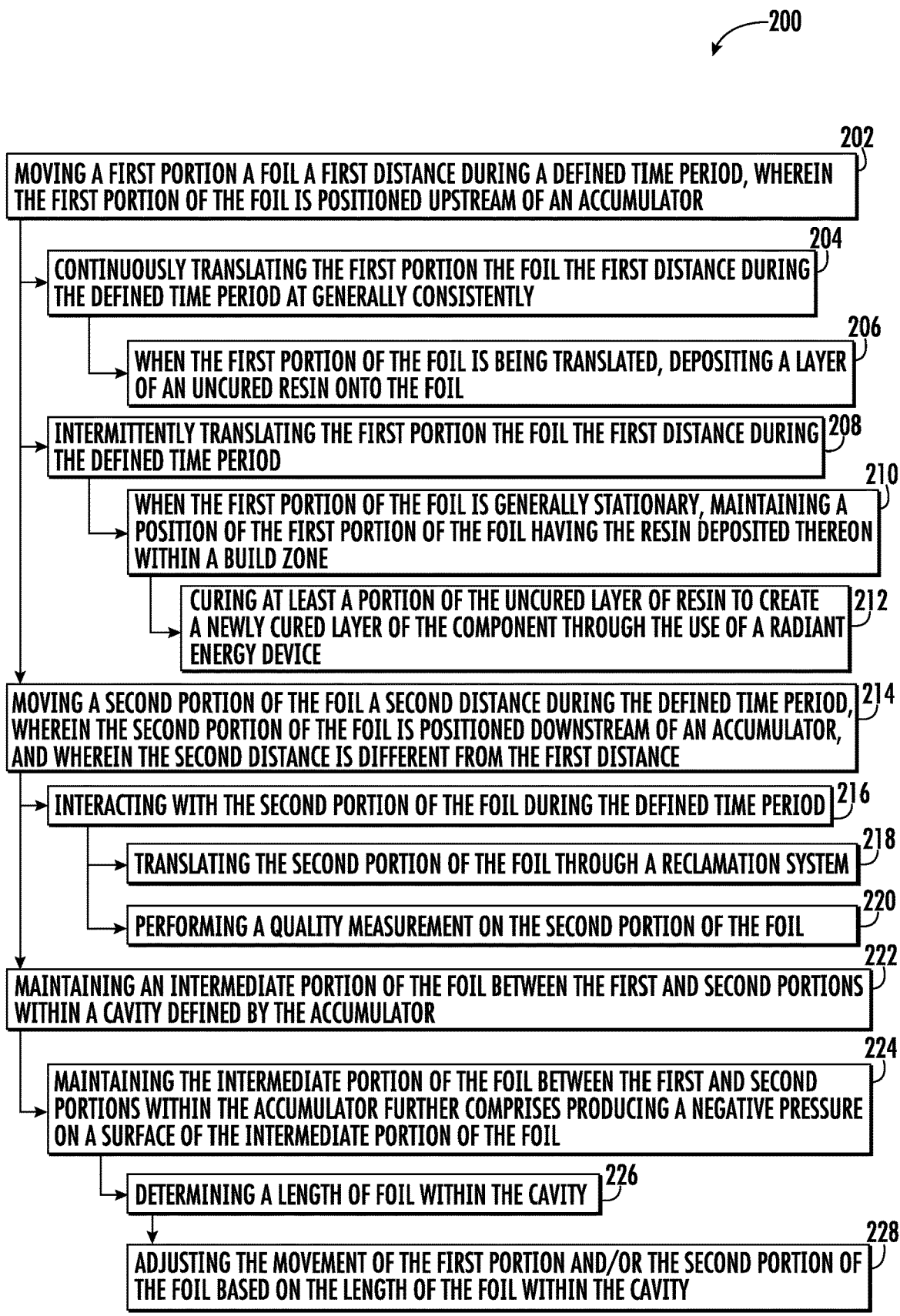
FIG. 13 is a method of operating the manufacturing apparatus in accordance with various aspects of the present disclosure.

Referring now to FIG. 13, the method 200 includes, at step 202, moving a first portion of a foil a first distance during a defined time period, wherein the first portion of the foil is positioned upstream of an accumulator. As the first portion of the foil is moved the first distance during the defined time period, one or more operations may be performed that incorporate the first portion of the foil. Moreover, at step 204, the method can include continuously translating the first portion of the foil the first distance during the defined time period at a generally constant speed. At step 206, when the first portion of the foil is being translated, the method can include depositing a layer of an uncured resin onto the foil. As provided herein, a material depositor may be positioned along the foil and is operable to apply the layer of uncured resin over the foil.

Additionally or alternatively, the method at step 208, can include intermittently translating the first portion the foil the first distance during the defined time period. At step 210, when the first portion of the foil is generally stationary, either at the end of the defined time period and/or during the time period, the method can include maintaining a position of the first portion of the foil having the resin deposited thereon within a build zone.

At step 212, when the first portion of the foil is generally stationary, the method can include moving the stage to contact the resin on the second side of the foil, and, at step 214, the method can include curing at least a portion of the uncured layer of resin to create a newly cured layer of the component through the use of a radiant energy device.

During the operation of steps 202-214, the method, at step 216, can include moving a second portion of the foil a second distance during the defined time period, wherein the second portion of the foil is positioned downstream of the accumulator. In various embodiments, the second distance is different from the first distance. At step 218, the method can include interacting with the second portion of the foil during the defined time period. At step 220, interacting with the second portion of the foil during the defined time period comprises translating the second portion of the foil through a reclamation system. Additionally or alternatively, at step 222, interacting with the second portion of the foil during the defined time period comprises performing a quality measurement on the second portion of the foil.

In order to allow for the first portion and the second portion of the foil to be moved different distances and/or for one to be moved while the other portion is stationary, an accumulator is positioned between the first and second portions of the foil. As such, at step 224, the method includes maintaining an intermediate portion of the foil between the first and second portions within the accumulator. As provided herein, the accumulator may define a cavity and the intermediate portion of the foil may be disposed within the cavity. In some instances, the method, at step 226, can include maintaining the intermediate portion of the foil between the first and second portions within the accumulator by producing a negative pressure on a surface of the intermediate portion of the foil.

The method, at step 228, can further include, determining a length of foil within the cavity, which may be accomplished through the use of one or more sensors. In some embodiments, at step 230, the method can further include adjusting the movement of the first portion and/or the second portion of the foil based on the length of the foil within the cavity. For example, in some embodiments, the foil length may be maintained within a predefined range during operation. If the length of the foil within the cavity is below a lower threshold of the range, the first portion of the foil may be translated at an increased speed and/or a quicker interval. Additionally, or alternatively, the second portion of the foil may be translated at a reduced speed and/or a slower interval. Similarly, if the length of the foil within the cavity is above an upper threshold of the range, the first portion of the foil may be translated at a reduced speed and/or a slower interval. Additionally, or alternatively, the second portion of the foil may be translated at an increased speed and/or a quicker interval. In various embodiments, a priority may be determined in which the speed and/or interval at which one of the first or second portion is changed may occur before the other of the first or second portion of the foil is changed. For example, the movement of the second portion of the foil may be altered prior to alteration of the first portion of the foil.

It will be appreciated that both the first distance and/or the second distance may be any length from zero meters to any defined length within the defined time period. In instances in which the first distance and/or the second distance is zero, the first portion of the foil and/or the second portion of the foil is generally stationary during the defined time period.

Figure 14:
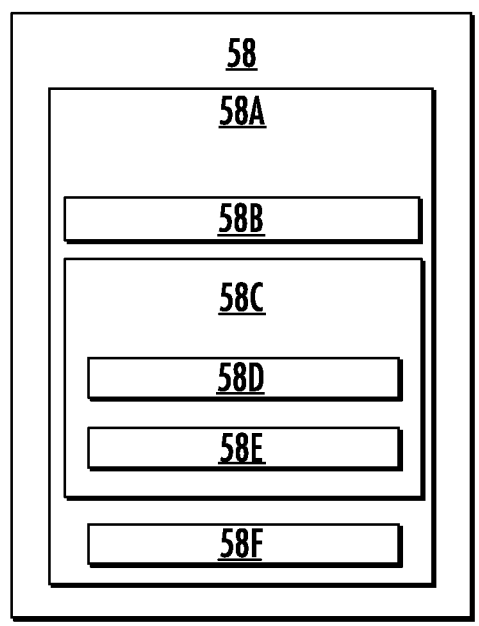
FIG. 14 depicts an exemplary computing system for an additive manufacturing apparatus in accordance with various aspects of the present disclosure.

FIG. 14 depicts certain components of computing system 58 according to example embodiments of the present disclosure. The computing system 58 can include one or more computing device(s) 58A which may be used to implement the method 200 such as described herein. The computing device(s) 58A can include one or more processor(s) 58B and one or more memory device(s) 58C. The one or more processor(s) 58B can include any suitable processing device, such as a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs) (e.g., dedicated to efficiently rendering images), processing units performing other specialized calculations, etc. The memory device(s) 58C can include one or more non-transitory computer-readable storage medium(s), such as RAM, ROM, EEPROM, EPROM, flash memory devices, magnetic disks, etc., and/or combinations thereof.

The memory device(s) 58C can include one or more computer-readable media and can store information accessible by the one or more processor(s) 58B, including instructions 58D that can be executed by the one or more processor(s) 58B. The instructions 58D may include one or more steps of the method 200 described above, such as to execute operations of the material retention assembly 86 of the additive manufacturing apparatus 10 described above. For instance, the memory device(s) 58C can store instructions 58D for running one or more software applications, displaying a user interface, receiving user input, processing user input, etc. In some implementations, the instructions 58D can be executed by the one or more processor(s) 58B to cause the one or more processor(s) 58B to perform operations, e.g., such as one or more portions of methods described herein. The instructions 58D can be software written in any suitable programming language or can be implemented in hardware. Additionally, and/or alternatively, the instructions 58D can be executed in logically and/or virtually separate threads on processor(s) 58B.

The one or more memory device(s) 58C can also store data 58E that can be retrieved, manipulated, created, or stored by the one or more processor(s) 58B. The data 58E can include, for instance, data to facilitate performance of the method 200 described herein. The data 58E can be stored in one or more database(s). The one or more database(s) can be connected to computing system 58 by a high bandwidth LAN or WAN or can also be connected to the computing system through network(s) (not shown). The one or more database(s) can be split up so that they are located in multiple locales. In some implementations, the data 58E can be received from another device.

The computing device(s) 58A can also include a communication module or interface 58F used to communicate with one or more other component(s) of computing system 58 or the additive manufacturing apparatus 10 over the network(s). The communication interface 58F can include any suitable components for interfacing with one or more network(s), including, for example, transmitters, receivers, ports, controllers, antennas, or other suitable components.

It should be appreciated that the additive manufacturing apparatus is described herein only for the purpose of explaining aspects of the present subject matter. In other example embodiments, the additive manufacturing apparatus may have any other suitable configuration and may use any other suitable additive manufacturing technology. Further, the additive manufacturing apparatus and processes or methods described herein may be used for forming components using any suitable material. For example, the material may be plastic, metal, concrete, ceramic, polymer, epoxy, photopolymer resin, or any other suitable material that may be embodied in a layer of slurry, resin, or any other suitable form of sheet material having any suitable consistency, viscosity, or material properties. For example, according to various embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, iron, iron alloys, stainless steel, and nickel or cobalt based superalloys (e.g., those available under the name Inconel® available from Special Metals Corporation). These materials are examples of materials suitable for use in the additive manufacturing processes described herein and may be generally referred to as "additive materials."

Aspects of the invention(s) are provided by the subject matter of the following clauses, which are intended to cover all suitable combinations unless dictated otherwise based on logic or the context of the clauses and/or associated figures and description:

An additive manufacturing apparatus comprising a feed module configured to operably couple with a first end portion of a foil; a take-up module configured to operably couple with a second end portion of a foil; at least one stage configured to hold one or more cured layers of a resin that form a component; a radiant energy device positioned opposite to the at least one stage, the radiant energy device operable to generate and project radiant energy in a predetermined pattern; an actuator configured to change a relative position of the at least one stage and the foil; and an accumulator positioned between the feed module and the take-up module, the accumulator configured to retain an intermediate portion of the foil to allow a first portion of the foil upstream of the accumulator to move at a first speed and a second portion of the foil downstream of the accumulator to move at a second speed during a defined time period.

The additive manufacturing apparatus of one or more of these clauses, wherein the accumulator defines a cavity, the cavity configured to retain at least a section of the intermediate portion of the foil.

The additive manufacturing apparatus of one or more of these clauses, further comprising a reclamation system configured to remove at least a portion of the resin from the foil.

The additive manufacturing apparatus of one or more of these clauses, wherein the accumulator is configured to allow the first portion of the foil upstream of the accumulator to move intermittently while the second portion of the foil downstream of the accumulator to move continuously.

The additive manufacturing apparatus of one or more of these clauses, further comprising a material retention assembly within the accumulator.

The additive manufacturing apparatus of one or more of these clauses, wherein the material retention assembly includes a pneumatic actuation zone that is configured to selectively interact with the foil by producing a force on a first side of the foil, the first side of the foil being opposite the resin.

The additive manufacturing apparatus of one or more of these clauses, wherein the material retention assembly includes at least one retaining roller within a cavity defined by the accumulator.

The additive manufacturing apparatus of one or more of these clauses, further comprising a sensor configured to detect a length of the foil within the accumulator.

The additive manufacturing apparatus of one or more of these clauses, further comprising a computing system operably coupled with a detection system, the computing system configured to determine a speed of the second portion of the foil downstream of the accumulator based on an amount of the foil within the cavity.

The additive manufacturing apparatus of one or more of these clauses, further comprising one or more guides within the accumulator, the one or more guides including at least one roller or at least one pneumatic device configured to contact the foil externally from a cavity of the accumulator.

The additive manufacturing apparatus of one or more of these clauses, wherein the at least one stage includes a plurality of stages in parallel, and wherein each of the plurality of stages are positioned between a material depositor and the accumulator.

A method of operating an additive manufacturing apparatus, the method comprising moving a first portion of a foil a first distance during a defined time period, wherein the first portion of the foil is positioned upstream of an accumulator; and moving a second portion of the foil a second distance during the defined time period, wherein the second portion of the foil is positioned downstream of the accumulator, and wherein the second distance is different from the first distance.

The method of one or more of these clauses, further comprising depositing a layer of resin onto the first portion of the foil during the defined time period.

The method of one or more of these clauses, further comprising maintaining an intermediate portion of the foil between the first and second portions within a cavity defined by the accumulator.

The method of one or more of these clauses, wherein maintaining the intermediate portion of the foil between the first and second portions within the accumulator further comprises producing a negative pressure on a surface of the intermediate portion of the foil.

The method of one or more of these clauses, further comprising interacting with the second portion of the foil during the defined time period.

An additive manufacturing apparatus comprising a feed module configured to operably couple with a first end portion of a foil; a take-up module configured to operably couple with a second end portion of a foil; a stage configured to hold one or more cured layers of a resin that form a component; a radiant energy device positioned opposite to the stage, radiant energy device operable to generate and project radiant energy in a predetermined pattern; an actuator configured to change a relative position of the stage and the foil; a reclamation system configured to remove at least a portion of the resin from the foil; and an accumulator positioned between the stage and the reclamation system.

The additive manufacturing apparatus of one or more of these clauses, wherein a first portion the foil upstream of the accumulator is stationary while a second portion of the foil downstream of the accumulator moves through the reclamation system.

The additive manufacturing apparatus of one or more of these clauses, wherein the first portion of the foil is operably coupled with a material depositor and the second portion of the foil is operably coupled with the reclamation system.

The additive manufacturing apparatus of one or more of these clauses, further comprising a material retention assembly within the accumulator.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An additive manufacturing apparatus comprising:
    a feed module configured to operably couple with a first end portion of a foil;
    a take-up module configured to operably couple with a second end portion of the foil;
    at least one stage configured to hold one or more cured layers of a resin that form a component;
    an accumulator positioned between the feed module and the take-up module, the accumulator configured to retain an intermediate portion of the foil to allow a first portion of the foil upstream of the accumulator to move at a first speed and a second portion of the foil downstream of the accumulator to move at a second speed during a defined time period; and
    a detection system configured to provide data related to one or more conditions of the accumulator or the foil within the accumulator.

2. The additive manufacturing apparatus of claim 1, wherein the accumulator defines a cavity, the cavity configured to retain at least a section of the intermediate portion of the foil.

3. The additive manufacturing apparatus of claim 1, further comprising:
    a computing system operably coupled with the detection system, the computing system configured to determine one or more conditions of the accumulator or the foil within the accumulator based on the data.

4. The additive manufacturing apparatus of claim 1, wherein the one or more conditions includes a length of the foil within the accumulator, a distance from a lowermost portion of the foil above a bottom portion of a cavity of the accumulator, an amount of the foil within the cavity of the accumulator, a change in the amount of the foil within the accumulator, or a speed at which the foil enters and exits the cavity.

5. The additive manufacturing apparatus of claim 1, wherein the detection system includes a sensor configured to detect the one or more conditions of the accumulator or the foil within the accumulator.

6. The additive manufacturing apparatus of claim 1, wherein the detection system includes one or more bypass holes that form a passive valve system.

7. The additive manufacturing apparatus of claim 6, wherein the one or more bypass holes are defined within a cavity plate that extends rearwardly or forwardly of a cavity of the accumulator.

8. The additive manufacturing apparatus of claim 6, wherein the one or more bypass holes are defined by a housing of the accumulator, and wherein the one or more bypass holes extend along the housing that defines a cavity of the accumulator.

9. The additive manufacturing apparatus of claim 1, further comprising:
    a material retention assembly within the accumulator.

10. The additive manufacturing apparatus of claim 1, further comprising:
    one or more guides within the accumulator, the one or more guides including at least one roller or at least one pneumatic device configured to contact the foil externally from a cavity of the accumulator.

11. An additive manufacturing apparatus comprising:
    a feed module configured to operably couple with a first end portion of a foil;

a take-up module configured to operably couple with a second end portion of the foil;

at least one stage configured to hold one or more cured layers of a resin that form a component;

an accumulator positioned between the feed module and the take-up module, the accumulator configured to retain an intermediate portion of the foil;

a detection system configured to provide data related to one or more conditions of the accumulator or the foil within the accumulator; and a computing system operably coupled with the detection system, the computing system configured to determine one or more conditions of the accumulator or the foil within the accumulator based on the data.

12. The additive manufacturing apparatus of claim 11, wherein the one or more conditions includes a length of the foil within the accumulator, a distance from a lowermost portion of the foil above a bottom portion of a cavity of the accumulator, an amount of the foil within the cavity of the accumulator, a change in the amount of the foil within the accumulator, or a speed at which the foil enters and exits the cavity.

13. The additive manufacturing apparatus of claim 11, wherein the detection system includes include one or more bypass holes that form a passive valve system.

14. The additive manufacturing apparatus of claim 11, further comprising:

a reclamation system configured to remove at least a portion of the resin from the foil.

* * * * *